(12) United States Patent
Lievens et al.

(10) Patent No.: US 10,339,492 B2
(45) Date of Patent: Jul. 2, 2019

(54) SYSTEMS AND METHODS OF RE-ROUTING PARCELS INTENDED FOR DELIVERY TO ATTENDED DELIVERY/PICKUP LOCATIONS

(71) Applicant: United Parcel Service of America, Inc., Atlanta, GA (US)

(72) Inventors: Daniel Lievens, Ressegem (BE); Vincent Dethier, Brussels (BE); Luc Pirenne, Brussels (BE)

(73) Assignee: United Parcel Services of America, Inc., Atlanta, GA (US)

( * ) Notice: Subject to any disclaimer, the term of this patent is extended or adjusted under 35 U.S.C. 154(b) by 0 days.

(21) Appl. No.: 14/200,432

(22) Filed: Mar. 7, 2014

(65) Prior Publication Data

US 2014/0279663 A1 Sep. 18, 2014

Related U.S. Application Data

(60) Provisional application No. 61/791,008, filed on Mar. 15, 2013, provisional application No. 61/777,968, filed on Mar. 12, 2013.

(51) Int. Cl.
*G06Q 10/08* (2012.01)
*G06Q 30/02* (2012.01)
(Continued)

(52) U.S. Cl.
CPC ......... *G06Q 10/0837* (2013.01); *G06Q 10/02* (2013.01); *G06Q 10/06312* (2013.01);
(Continued)

(58) Field of Classification Search
CPC ............... G06Q 10/0836; G06Q 10/02; G06Q 10/06312; G06Q 10/083; G06Q 10/0832;
(Continued)

(56) References Cited

U.S. PATENT DOCUMENTS

| 3,712,468 A | 1/1973 | Wenner et al. |
| 5,153,842 A | 10/1992 | Dlugos, Sr. et al. |

(Continued)

FOREIGN PATENT DOCUMENTS

| CA | 2893502 A1 | 11/2004 |
| CA | 2551885 | 8/2005 |

(Continued)

OTHER PUBLICATIONS

Giuffrida, Maria, Riccardo Mangiaracina, and A. Tumino. "Home Delivery vs Parcel Lockers: an economic and environmental assessment." Proceedings of XXI Summer School"Francesco Turco"—Industrial Systems Engineering (2012): 225-230.*

(Continued)

*Primary Examiner* — Daniel Vetter
*Assistant Examiner* — Scott M Tungate
(74) *Attorney, Agent, or Firm* — Shook, Hardy & Bacon L.L.P.

(57) ABSTRACT

Systems and methods for re-routing parcels being delivered to attended delivery/pickup locations that have no capacity and/or ability to take delivery of the parcels. In various embodiments, in response to determining that the attended delivery/pickup location doesn't have sufficient capacity and/or ability to accept delivery of the parcel, the system is configured to: (1) re-route the parcel to a different location; or (2) hold the parcel for later delivery. In some embodiments, the system is configured to determine an appropriate response to determining that the attended delivery/pickup location cannot accept delivery of the parcel substantially automatically. In other embodiments, the system is configured to provide the parcel recipient with one or more re-routing options.

20 Claims, 5 Drawing Sheets

(51) Int. Cl.
  *G06Q 10/02* (2012.01)
  *G06Q 10/06* (2012.01)
  *G06Q 50/28* (2012.01)
  *G06Q 20/40* (2012.01)

(52) U.S. Cl.
  CPC ......... *G06Q 10/083* (2013.01); *G06Q 10/087* (2013.01); *G06Q 10/0832* (2013.01); *G06Q 10/0833* (2013.01); *G06Q 10/0835* (2013.01); *G06Q 10/0836* (2013.01); *G06Q 10/08345* (2013.01); *G06Q 10/08355* (2013.01); *G06Q 20/407* (2013.01); *G06Q 30/02* (2013.01); *G06Q 30/0207* (2013.01); *G06Q 30/0233* (2013.01); *G06Q 50/28* (2013.01)

(58) Field of Classification Search
  CPC ......... G06Q 10/0833; G06Q 10/08345; G06Q 10/0835; G06Q 10/08355; G06Q 10/087; G06Q 20/407; G06Q 30/02; G06Q 30/0207; G06Q 30/0233; G06Q 50/28
  See application file for complete search history.

(56) References Cited

U.S. PATENT DOCUMENTS

| | | |
|---|---|---|
| 5,168,444 A | 12/1992 | Cukor et al. |
| 5,375,240 A | 12/1994 | Grundy |
| 5,400,020 A | 3/1995 | Jones et al. |
| 5,444,444 A | 8/1995 | Ross |
| 5,623,260 A | 4/1997 | Jones |
| 5,648,770 A | 7/1997 | Ross |
| 5,656,799 A | 8/1997 | Ramsden et al. |
| 5,657,010 A | 8/1997 | Jones |
| 5,668,543 A | 9/1997 | Jones |
| 5,726,435 A | 3/1998 | Hara et al. |
| 5,774,053 A | 6/1998 | Porter |
| 5,786,748 A | 7/1998 | Nikolic et al. |
| 5,831,220 A | 11/1998 | Ramsden et al. |
| 5,831,860 A | 11/1998 | Foladare et al. |
| 5,979,750 A | 11/1999 | Kindell |
| 6,010,064 A | 1/2000 | Umeda et al. |
| 6,028,517 A | 2/2000 | Sansone et al. |
| 6,047,264 A | 4/2000 | Fisher et al. |
| 6,085,170 A | 7/2000 | Tsukuda |
| 6,208,980 B1 | 3/2001 | Kara |
| 6,211,781 B1 | 4/2001 | McDonald |
| 6,220,509 B1 | 4/2001 | Byford |
| 6,236,972 B1 | 5/2001 | Shkedy |
| 6,278,936 B1 | 8/2001 | Jones |
| 6,285,916 B1 | 9/2001 | Kadaba et al. |
| 6,289,323 B1 | 9/2001 | Gordon et al. |
| 6,304,856 B1 | 10/2001 | Soga et al. |
| 6,313,760 B1 | 11/2001 | Jones |
| 6,317,060 B1 | 11/2001 | Jones |
| 6,323,254 B1 | 11/2001 | Weikard et al. |
| 6,323,782 B1 | 11/2001 | Stephens et al. |
| 6,343,275 B1 | 1/2002 | Wong |
| 6,344,796 B1 | 2/2002 | Ogilvie et al. |
| 6,356,196 B1 | 3/2002 | Wong et al. |
| 6,363,323 B1 | 3/2002 | Jones |
| 6,411,891 B1 | 6/2002 | Jones |
| 6,433,732 B1 | 8/2002 | Dutta et al. |
| 6,442,589 B1 | 8/2002 | Takahashi et al. |
| 6,456,900 B1 | 9/2002 | Kakuta |
| 6,463,420 B1 | 10/2002 | Guidice et al. |
| 6,480,758 B2 | 11/2002 | Stevens |
| 6,486,801 B1 | 11/2002 | Jones |
| 6,492,912 B1 | 12/2002 | Jones |
| 6,510,383 B1 | 1/2003 | Jones |
| 6,536,659 B1 | 3/2003 | Hauser et al. |
| 6,539,360 B1 | 3/2003 | Kadaba |
| 6,570,488 B2 | 5/2003 | Kucharczyk et al. |
| 6,595,342 B1 | 7/2003 | Maritzen et al. |
| 6,606,604 B1 | 8/2003 | Dutta |
| 6,612,489 B2 | 9/2003 | McCormick et al. |
| 6,615,092 B2 | 9/2003 | Bickley et al. |
| 6,618,668 B1 | 9/2003 | Laird |
| 6,634,551 B2 | 10/2003 | Barta et al. |
| 6,683,542 B1 | 1/2004 | Jones |
| 6,688,435 B1 | 2/2004 | Will et al. |
| 6,690,997 B2 | 2/2004 | Rivalto |
| 6,694,217 B2 | 2/2004 | Bloom |
| 6,700,507 B2 | 3/2004 | Jones |
| 6,701,299 B2 | 3/2004 | Kraisser et al. |
| 6,714,859 B2 | 3/2004 | Jones |
| 6,725,127 B2 | 4/2004 | Stevens |
| 6,741,927 B2 | 5/2004 | Jones |
| 6,748,295 B2 | 6/2004 | Tilles et al. |
| 6,748,318 B1 | 6/2004 | Jones |
| 6,748,320 B2 | 6/2004 | Jones |
| 6,756,879 B2 | 6/2004 | Shuster |
| 6,763,299 B2 | 7/2004 | Jones |
| 6,763,300 B2 | 7/2004 | Jones |
| 6,772,130 B1 | 8/2004 | Karbowski et al. |
| 6,791,450 B2 | 9/2004 | Gokcebay et al. |
| 6,804,606 B2 | 10/2004 | Jones |
| 6,820,805 B2 | 11/2004 | Stevens |
| 6,845,909 B2 | 1/2005 | Bong et al. |
| 6,859,722 B2 | 2/2005 | Jones |
| 6,862,576 B1 | 3/2005 | Turner et al. |
| 6,882,269 B2 | 4/2005 | Moreno |
| 6,902,109 B2 | 6/2005 | Barta et al. |
| 6,904,359 B2 | 6/2005 | Jones |
| 6,933,832 B1 | 8/2005 | Simms et al. |
| 6,950,803 B2 | 9/2005 | Tiley et al. |
| 6,952,645 B1 | 10/2005 | Jones |
| 6,961,711 B1 | 11/2005 | Chee |
| 6,967,575 B1 | 11/2005 | Dohrmann et al. |
| 6,974,928 B2 | 12/2005 | Bloom |
| 6,975,998 B1 | 12/2005 | Jones |
| 6,976,090 B2 | 12/2005 | Ben-Shaul et al. |
| 6,978,929 B2 | 12/2005 | Buie et al. |
| 6,985,871 B2 | 1/2006 | Simon et al. |
| 6,990,467 B1 | 1/2006 | Kwan |
| 6,994,253 B2 | 2/2006 | Miller et al. |
| 7,020,623 B1 | 3/2006 | Tiley et al. |
| 7,028,895 B2 | 4/2006 | Ashaari |
| 7,030,781 B2 | 4/2006 | Jones |
| 7,031,959 B2 | 4/2006 | Garner et al. |
| 7,055,741 B2 | 6/2006 | Bong et al. |
| 7,068,149 B2 | 6/2006 | Lee et al. |
| 7,075,451 B2 | 7/2006 | Yamada |
| 7,110,958 B2 | 9/2006 | Yang |
| 7,133,743 B2 | 11/2006 | Tilles et al. |
| 7,158,941 B1 | 1/2007 | Thompson |
| 7,158,948 B1 | 1/2007 | Rodriguez et al. |
| 7,177,825 B1 | 2/2007 | Borders et al. |
| 7,212,829 B1 | 5/2007 | Lau et al. |
| 7,212,984 B2 | 5/2007 | Wolfe et al. |
| 7,222,081 B1 | 5/2007 | Sone |
| 7,225,983 B2 | 6/2007 | Park et al. |
| 7,233,907 B2 | 6/2007 | Young |
| 7,248,160 B2 | 7/2007 | Mangan et al. |
| 7,249,044 B2 | 7/2007 | Kumar et al. |
| 7,249,087 B2 | 7/2007 | Sharp et al. |
| 7,254,549 B1 | 8/2007 | Bansal et al. |
| 7,257,552 B1 | 8/2007 | Franco |
| 7,267,920 B2 | 9/2007 | Nakazawa et al. |
| 7,312,702 B1 | 12/2007 | Willms et al. |
| 7,337,944 B2 | 3/2008 | Devar |
| 7,341,186 B2 | 3/2008 | Mrozik et al. |
| 7,358,857 B1 | 4/2008 | White |
| 7,376,598 B2 | 5/2008 | Estes et al. |
| 7,385,499 B2 | 6/2008 | Horton et al. |
| 7,422,149 B2 | 9/2008 | Aptekar |
| 7,426,484 B2 | 9/2008 | Joyce et al. |
| 7,479,899 B2 | 1/2009 | Horstemeyer |
| 7,501,946 B2 | 3/2009 | Lanigan et al. |
| 7,509,228 B2 | 3/2009 | Bielefeld et al. |
| 7,511,617 B2 | 3/2009 | Burman et al. |
| 7,528,722 B2 | 5/2009 | Nelson |
| 7,574,366 B2 | 8/2009 | Burman et al. |
| 7,580,845 B2 | 8/2009 | Burman et al. |

(56) References Cited

U.S. PATENT DOCUMENTS

| | | |
|---|---|---|
| 7,617,133 B1 | 11/2009 | Antony et al. |
| 7,624,024 B2 | 11/2009 | Levis et al. |
| 7,647,231 B2 | 1/2010 | Kuebert et al. |
| 7,653,457 B2 | 1/2010 | Bloom |
| 7,653,603 B1 | 1/2010 | Holtkamp, Jr. et al. |
| 7,657,466 B2 | 2/2010 | Klingenberg et al. |
| 7,693,723 B2 | 4/2010 | Wade |
| 7,711,654 B2 | 5/2010 | Schmidtberg et al. |
| 7,712,670 B2 | 5/2010 | Sauerwein, Jr. et al. |
| 7,742,928 B2 | 6/2010 | Reynolds et al. |
| 7,752,134 B2 | 7/2010 | Spear |
| 7,765,131 B2 | 7/2010 | Klingenberg et al. |
| 7,769,778 B2 | 8/2010 | Snapp et al. |
| 7,815,112 B2 | 10/2010 | Volpe et al. |
| 7,822,618 B2 | 10/2010 | Kaneko |
| 7,831,439 B1 | 11/2010 | Bryar et al. |
| 7,848,961 B2 | 12/2010 | Estes et al. |
| 7,853,481 B1 | 12/2010 | Johnson |
| 7,868,753 B2 | 1/2011 | Jenkins et al. |
| 7,925,524 B2 | 4/2011 | Florence |
| 7,962,422 B1 * | 6/2011 | Melechko ............... G06Q 10/08 705/1.1 |
| 7,969,306 B2 | 6/2011 | Ebert et al. |
| 7,984,289 B2 | 7/2011 | Orbke et al. |
| 7,996,328 B1 | 8/2011 | Lundberg et al. |
| 8,010,430 B1 | 8/2011 | Chase et al. |
| 8,010,462 B2 | 8/2011 | Kinory et al. |
| 8,015,023 B1 | 9/2011 | Lee et al. |
| 8,027,933 B2 | 9/2011 | Lou et al. |
| 8,036,993 B2 | 10/2011 | Estes |
| 8,073,723 B1 | 12/2011 | Bilibin et al. |
| 8,086,546 B2 | 12/2011 | Spiegel et al. |
| 8,103,521 B2 | 1/2012 | Kuebert et al. |
| 8,103,716 B2 | 1/2012 | Boyce et al. |
| 8,108,265 B2 | 1/2012 | Bonner et al. |
| 8,117,462 B2 | 2/2012 | Snapp et al. |
| 8,131,652 B2 | 3/2012 | Gullo et al. |
| 8,140,551 B2 | 3/2012 | Garner et al. |
| 8,140,592 B2 | 3/2012 | Scott et al. |
| 8,156,007 B1 | 4/2012 | Anthony et al. |
| 8,204,799 B1 | 6/2012 | Murray et al. |
| 8,219,490 B2 | 7/2012 | Hammad et al. |
| 8,225,388 B2 | 7/2012 | Vogel et al. |
| 8,234,275 B2 | 7/2012 | Grant et al. |
| 8,249,998 B2 | 8/2012 | Reynolds et al. |
| 8,255,235 B2 | 8/2012 | Aldstadt |
| 8,255,339 B2 | 8/2012 | Andrew |
| 8,265,947 B2 | 9/2012 | Kuebert et al. |
| 8,280,824 B1 | 10/2012 | Vermeulen et al. |
| 8,291,234 B2 | 10/2012 | Snapp et al. |
| 8,306,923 B1 | 11/2012 | Roache et al. |
| 8,311,895 B1 | 11/2012 | Murugan et al. |
| 8,340,978 B2 | 12/2012 | Wade |
| 8,352,551 B2 | 1/2013 | Campbell et al. |
| 8,356,187 B2 | 1/2013 | Cook et al. |
| 8,364,953 B2 | 1/2013 | Bullard, Jr. |
| 8,380,641 B1 | 2/2013 | Bennett et al. |
| 8,392,262 B2 | 3/2013 | Mallick et al. |
| 8,437,742 B2 | 5/2013 | Garskof |
| 8,468,062 B1 | 6/2013 | Kamdar |
| 8,489,520 B2 | 7/2013 | Kuebert et al. |
| 9,141,931 B2 | 9/2015 | Ackerman |
| 9,195,950 B2 | 11/2015 | Schenken et al. |
| 9,692,738 B1 | 6/2017 | Wenneman et al. |
| 9,916,557 B1 | 3/2018 | Gillen et al. |
| 10,007,712 B1 | 6/2018 | Williams et al. |
| 2001/0040422 A1 | 11/2001 | Gramlich |
| 2001/0042001 A1 | 11/2001 | Goto et al. |
| 2001/0042024 A1 | 11/2001 | Rogers |
| 2001/0051885 A1 | 12/2001 | Nardulli et al. |
| 2002/0007299 A1 | 1/2002 | Florence |
| 2002/0007353 A1 | 1/2002 | Kornacki |
| 2002/0010634 A1 | 1/2002 | Roman et al. |
| 2002/0013744 A1 | 1/2002 | Tsunenari et al. |
| 2002/0016726 A1 | 2/2002 | Ross |
| 2002/0019761 A1 | 2/2002 | Lidow |
| 2002/0019777 A1 | 2/2002 | Schwab et al. |
| 2002/0029194 A1 | 3/2002 | Lewis et al. |
| 2002/0032612 A1 | 3/2002 | Williams et al. |
| 2002/0032613 A1 | 3/2002 | Buettgenbach et al. |
| 2002/0035515 A1 | 3/2002 | Moreno |
| 2002/0038266 A1 | 3/2002 | Tuttrup et al. |
| 2002/0040350 A1 | 4/2002 | Shinzaki |
| 2002/0046056 A1 | 4/2002 | Demarco et al. |
| 2002/0070882 A1 | 6/2002 | Jones |
| 2002/0073039 A1 | 6/2002 | Ogg et al. |
| 2002/0080030 A1 | 6/2002 | Inomata |
| 2002/0082770 A1 | 6/2002 | Jones |
| 2002/0087371 A1 | 7/2002 | Abendroth |
| 2002/0103653 A1 | 8/2002 | Huxter |
| 2002/0103724 A1 | 8/2002 | Huxter |
| 2002/0107820 A1 * | 8/2002 | Huxter ................. G06Q 10/087 705/402 |
| 2002/0111914 A1 | 8/2002 | Terada et al. |
| 2002/0120475 A1 | 8/2002 | Morimoto |
| 2002/0128915 A1 | 9/2002 | Haseltine |
| 2002/0130065 A1 | 9/2002 | Bloom |
| 2002/0138173 A1 | 9/2002 | Barta et al. |
| 2002/0143670 A1 | 10/2002 | Cushing et al. |
| 2002/0147919 A1 | 10/2002 | Gentry |
| 2002/0156645 A1 | 10/2002 | Hansen |
| 2002/0156846 A1 | 10/2002 | Rawat et al. |
| 2002/0165729 A1 | 11/2002 | Kuebert et al. |
| 2002/0177922 A1 | 11/2002 | Bloom |
| 2002/0178016 A1 | 11/2002 | McLellan |
| 2002/0178074 A1 | 11/2002 | Bloom |
| 2002/0184497 A1 | 12/2002 | Gage et al. |
| 2003/0003936 A1 | 1/2003 | Tighe |
| 2003/0023963 A1 | 1/2003 | Birkholz et al. |
| 2003/0025590 A1 | 2/2003 | Gokcebay et al. |
| 2003/0037009 A1 | 2/2003 | Tobin et al. |
| 2003/0040931 A1 | 2/2003 | De Mol Van Otterloo et al. |
| 2003/0040980 A1 | 2/2003 | Nakajima et al. |
| 2003/0046173 A1 | 3/2003 | Benjier et al. |
| 2003/0093180 A1 | 5/2003 | Stevens |
| 2003/0097287 A1 | 5/2003 | Franz et al. |
| 2003/0110170 A1 | 6/2003 | Matsuoka |
| 2003/0114206 A1 | 6/2003 | Timothy et al. |
| 2003/0160097 A1 | 8/2003 | Steiner |
| 2003/0171996 A1 | 9/2003 | Chen et al. |
| 2003/0193414 A1 | 10/2003 | Jones |
| 2003/0195784 A1 | 10/2003 | Smith, Jr. |
| 2003/0225625 A1 | 12/2003 | Chew et al. |
| 2004/0015393 A1 | 1/2004 | Fong et al. |
| 2004/0030604 A1 | 2/2004 | Young |
| 2004/0039712 A1 | 2/2004 | Tartal et al. |
| 2004/0044582 A1 | 3/2004 | Chowdhary et al. |
| 2004/0073449 A1 | 4/2004 | Yang |
| 2004/0073499 A1 | 4/2004 | Martin et al. |
| 2004/0088225 A1 | 5/2004 | Foth et al. |
| 2004/0093312 A1 | 5/2004 | Cordery et al. |
| 2004/0117276 A1 | 6/2004 | Kettler, III |
| 2004/0117278 A1 | 6/2004 | Dutta et al. |
| 2004/0117326 A1 | 6/2004 | Amato |
| 2004/0133446 A1 | 7/2004 | Myrick et al. |
| 2004/0134690 A1 | 7/2004 | Norris, Jr. et al. |
| 2004/0143518 A1 | 7/2004 | Siegel |
| 2004/0149822 A1 | 8/2004 | Stevens et al. |
| 2004/0149824 A1 | 8/2004 | Miller et al. |
| 2004/0153370 A1 | 8/2004 | Yang |
| 2004/0158351 A1 | 8/2004 | Rivalto |
| 2004/0172260 A1 | 9/2004 | Junger et al. |
| 2004/0181310 A1 | 9/2004 | Stashluk, Jr. et al. |
| 2004/0199284 A1 | 10/2004 | Hara |
| 2004/0199656 A1 | 10/2004 | Pintsov |
| 2004/0211834 A1 | 10/2004 | Fleckenstein et al. |
| 2004/0215480 A1 | 10/2004 | Kadaba |
| 2004/0215588 A1 | 10/2004 | Cornelius |
| 2004/0254802 A1 | 12/2004 | Miller et al. |
| 2004/0254811 A1 | 12/2004 | Horstemeyer |
| 2004/0260470 A1 | 12/2004 | Rast |
| 2005/0004877 A1 | 1/2005 | McLellan et al. |
| 2005/0006470 A1 | 1/2005 | Mrozik et al. |
| 2005/0027607 A1 | 2/2005 | Pearson |

(56) References Cited

U.S. PATENT DOCUMENTS

| | | |
|---|---|---|
| 2005/0038758 A1 | 2/2005 | Hilbush et al. |
| 2005/0060164 A1 | 3/2005 | Eli Berl Illion |
| 2005/0060228 A1 | 3/2005 | Woo |
| 2005/0061877 A1 | 3/2005 | Stevens |
| 2005/0068178 A1 | 3/2005 | Lee et al. |
| 2005/0071258 A1 | 3/2005 | Kumakawa |
| 2005/0075989 A1 | 4/2005 | Baisi et al. |
| 2005/0080635 A1 | 4/2005 | Groff et al. |
| 2005/0080638 A1 | 4/2005 | Maseruka |
| 2005/0104716 A1 | 5/2005 | Simms et al. |
| 2005/0116033 A1 | 6/2005 | Moore |
| 2005/0119786 A1 | 6/2005 | Kadaba |
| 2005/0120003 A1 | 6/2005 | Drury et al. |
| 2005/0131774 A1 | 6/2005 | Huxter |
| 2005/0137901 A1 | 6/2005 | Siegel |
| 2005/0138382 A1 | 6/2005 | Hougaard et al. |
| 2005/0216553 A1 | 9/2005 | Mallonee et al. |
| 2005/0218222 A1 | 10/2005 | Nark et al. |
| 2005/0234911 A1 | 10/2005 | Hess et al. |
| 2005/0251402 A1 | 11/2005 | Olsen, III et al. |
| 2006/0010037 A1 | 1/2006 | Angell et al. |
| 2006/0010077 A1 | 1/2006 | Dohrmann et al. |
| 2006/0020366 A1 | 1/2006 | Bloom |
| 2006/0020489 A1 | 1/2006 | Rivalto |
| 2006/0041481 A1 | 2/2006 | Stowe |
| 2006/0047610 A1 | 3/2006 | Parkos et al. |
| 2006/0069601 A1 | 3/2006 | Simon et al. |
| 2006/0085273 A1 | 4/2006 | Mayer et al. |
| 2006/0097896 A1 | 5/2006 | Jones |
| 2006/0149577 A1 | 7/2006 | Stashluk et al. |
| 2006/0224512 A1 | 10/2006 | Kurakata |
| 2006/0229895 A1 | 10/2006 | Kodger, Jr. |
| 2006/0235739 A1 | 10/2006 | Levis et al. |
| 2006/0238334 A1 | 10/2006 | Mangan et al. |
| 2006/0282277 A1 | 12/2006 | Ng |
| 2006/0287870 A1 | 12/2006 | Mayer et al. |
| 2007/0005452 A1 | 1/2007 | Klingenberg et al. |
| 2007/0016538 A1 | 1/2007 | Bielefeld et al. |
| 2007/0036117 A1 | 2/2007 | Taube et al. |
| 2007/0047459 A1 | 3/2007 | Kadaba |
| 2007/0062851 A1 | 3/2007 | Schulz et al. |
| 2007/0078797 A1 | 4/2007 | Won et al. |
| 2007/0083410 A1 | 4/2007 | Hanna |
| 2007/0095904 A1 | 5/2007 | Barta et al. |
| 2007/0124295 A1 | 5/2007 | Forman et al. |
| 2007/0143281 A1 | 6/2007 | Smirin et al. |
| 2007/0150533 A1 | 6/2007 | Krause et al. |
| 2007/0156415 A1 | 7/2007 | Foth et al. |
| 2007/0185598 A1 | 8/2007 | Ortega |
| 2007/0192191 A1 | 8/2007 | Neal et al. |
| 2007/0198290 A1 | 8/2007 | Kinory et al. |
| 2007/0266081 A1 | 11/2007 | Murchison, III et al. |
| 2008/0004928 A1 | 1/2008 | Trellevik et al. |
| 2008/0004957 A1 | 1/2008 | Hildreth et al. |
| 2008/0004967 A1 | 1/2008 | Gillen |
| 2008/0004995 A1 | 1/2008 | Klingenberg et al. |
| 2008/0040246 A1 | 2/2008 | Fukamachi |
| 2008/0051995 A1 | 2/2008 | Lokshin et al. |
| 2008/0061966 A1 | 3/2008 | Nelson |
| 2008/0082346 A1 | 4/2008 | Hoopes et al. |
| 2008/0109246 A1 | 5/2008 | Russell |
| 2008/0121682 A1 | 5/2008 | Grim et al. |
| 2008/0133261 A1 | 6/2008 | Ray |
| 2008/0154781 A1 | 6/2008 | Kumar |
| 2008/0172305 A1 | 7/2008 | Estes et al. |
| 2008/0210749 A1 | 9/2008 | Skaaksrud et al. |
| 2008/0221913 A1 | 9/2008 | Cook et al. |
| 2008/0249830 A1 | 10/2008 | Gilman et al. |
| 2008/0313018 A1 | 12/2008 | Kamm, IV et al. |
| 2008/0319970 A1 | 12/2008 | Garner et al. |
| 2008/0320092 A1 | 12/2008 | Campbell et al. |
| 2009/0001153 A1 | 1/2009 | Lim |
| 2009/0012802 A1 | 1/2009 | Pinney |
| 2009/0043552 A1 | 2/2009 | Tomlinson, Jr. et al. |
| 2009/0046892 A1 | 2/2009 | Avant et al. |
| 2009/0063215 A1 | 3/2009 | Heise et al. |
| 2009/0106124 A1 | 4/2009 | Yang |
| 2009/0138730 A1 | 5/2009 | Cook et al. |
| 2009/0146832 A1 | 6/2009 | Ebert et al. |
| 2009/0164295 A1 | 6/2009 | Sion |
| 2009/0173672 A1 | 7/2009 | Avant et al. |
| 2009/0187489 A1 | 7/2009 | Mallick et al. |
| 2009/0240597 A1 | 9/2009 | Oswald |
| 2009/0259509 A1 | 10/2009 | Landvater |
| 2009/0281929 A1 | 11/2009 | Boitet et al. |
| 2009/0314835 A1 | 12/2009 | Jackson |
| 2009/0319078 A1 | 12/2009 | Jackson |
| 2009/0326971 A1 | 12/2009 | Piccinini et al. |
| 2010/0004960 A1* | 1/2010 | Frankenberg .......... G06Q 10/02 705/5 |
| 2010/0011238 A1 | 1/2010 | Nakamura et al. |
| 2010/0012769 A1 | 1/2010 | Alber et al. |
| 2010/0049536 A1 | 2/2010 | Quine et al. |
| 2010/0057592 A1 | 3/2010 | Moir et al. |
| 2010/0057593 A1 | 3/2010 | Moir et al. |
| 2010/0076903 A1 | 3/2010 | Klingenberg et al. |
| 2010/0100497 A1 | 4/2010 | Kuebert et al. |
| 2010/0114678 A1 | 5/2010 | Axe et al. |
| 2010/0121689 A1 | 5/2010 | Wallace et al. |
| 2010/0138281 A1 | 6/2010 | Zhang et al. |
| 2010/0162149 A1 | 6/2010 | Sheleheda et al. |
| 2010/0185565 A1 | 7/2010 | Wade |
| 2010/0211444 A1 | 8/2010 | Spear |
| 2010/0223127 A1 | 9/2010 | Bettez et al. |
| 2010/0223134 A1 | 9/2010 | Lunenfeld |
| 2010/0235290 A1 | 9/2010 | Junger et al. |
| 2010/0250291 A1 | 9/2010 | Walker et al. |
| 2010/0280955 A1 | 11/2010 | Ross et al. |
| 2011/0004562 A1 | 1/2011 | Hennessy et al. |
| 2011/0084162 A1 | 4/2011 | Goossen et al. |
| 2011/0093361 A1 | 4/2011 | Morales |
| 2011/0125665 A1 | 5/2011 | Kadaba |
| 2011/0153513 A1 | 6/2011 | Erie et al. |
| 2011/0191697 A1 | 8/2011 | Sumner et al. |
| 2011/0246323 A1 | 10/2011 | Mehta et al. |
| 2011/0270714 A1 | 11/2011 | Myrick et al. |
| 2011/0287748 A1 | 11/2011 | Angel et al. |
| 2011/0288896 A1 | 11/2011 | Dewey, Jr. et al. |
| 2012/0016948 A1 | 1/2012 | Sinha |
| 2012/0030124 A1 | 2/2012 | Cronkright, II et al. |
| 2012/0030133 A1 | 2/2012 | Rademaker |
| 2012/0047084 A1 | 2/2012 | Naghshineh et al. |
| 2012/0047085 A1 | 2/2012 | Naghshineh et al. |
| 2012/0062362 A1 | 3/2012 | Rudduck et al. |
| 2012/0089532 A1 | 4/2012 | Kuebert et al. |
| 2012/0095934 A1 | 4/2012 | Klingenberg et al. |
| 2012/0130625 A1 | 5/2012 | Srivastava |
| 2012/0130916 A1 | 5/2012 | Neal et al. |
| 2012/0166320 A1 | 6/2012 | Junger |
| 2012/0179622 A1 | 7/2012 | Amato |
| 2012/0185363 A1 | 7/2012 | Gilbert |
| 2012/0235786 A1 | 9/2012 | Rudduck et al. |
| 2012/0246077 A1 | 9/2012 | Skaaksrud et al. |
| 2012/0303539 A1 | 11/2012 | Marcus et al. |
| 2012/0303541 A1 | 11/2012 | Marcus et al. |
| 2012/0303542 A1 | 11/2012 | Marcus et al. |
| 2012/0310853 A1 | 12/2012 | Aldstadt |
| 2012/0330774 A1 | 12/2012 | Sadot et al. |
| 2013/0006731 A1 | 1/2013 | Cook et al. |
| 2013/0006885 A1 | 1/2013 | Kuebert et al. |
| 2013/0013101 A1 | 1/2013 | Bonnell et al. |
| 2013/0013102 A1 | 1/2013 | Bonnell et al. |
| 2013/0013350 A1 | 1/2013 | McCullough et al. |
| 2013/0016636 A1 | 1/2013 | Berger et al. |
| 2013/0018894 A1 | 1/2013 | Qiao |
| 2013/0018999 A1 | 1/2013 | Merrill et al. |
| 2013/0024307 A1 | 1/2013 | Fuerstenberg et al. |
| 2013/0054054 A1 | 2/2013 | Tollenaere et al. |
| 2013/0061337 A1 | 3/2013 | Zimberoff et al. |
| 2013/0073336 A1 | 3/2013 | Heath |
| 2013/0073605 A1 | 3/2013 | Fosburgh et al. |
| 2013/0088323 A1 | 4/2013 | Ryan |
| 2013/0144428 A1* | 6/2013 | Irwin .................. B65G 1/0485 700/218 |

(56) References Cited

U.S. PATENT DOCUMENTS

| | | |
|---|---|---|
| 2013/0151419 A1 | 6/2013 | Hitchcock et al. |
| 2013/0166067 A1 | 6/2013 | Irwin et al. |
| 2013/0202185 A1 | 8/2013 | Irwin, Jr. et al. |
| 2013/0238599 A1 | 9/2013 | Burris |
| 2013/0238658 A1 | 9/2013 | Burris |
| 2013/0246396 A1 | 9/2013 | Clare et al. |
| 2013/0262311 A1 | 10/2013 | Buhrmann et al. |
| 2013/0262336 A1 | 10/2013 | Wan et al. |
| 2013/0268437 A1 | 10/2013 | Desai et al. |
| 2013/0338822 A1 | 12/2013 | Gibson, Jr. et al. |
| 2014/0034727 A1 | 2/2014 | Hancock et al. |
| 2014/0052661 A1 | 2/2014 | Shakes et al. |
| 2014/0081677 A1 | 3/2014 | Craig et al. |
| 2014/0180959 A1 | 6/2014 | Gillen et al. |
| 2014/0222711 A1 | 8/2014 | Tibbs et al. |
| 2014/0236688 A1 | 8/2014 | Minter et al. |
| 2014/0258098 A1 | 9/2014 | Felix et al. |
| 2014/0279663 A1 | 9/2014 | Lievens et al. |
| 2014/0279666 A1 | 9/2014 | Lievens et al. |
| 2014/0279667 A1 | 9/2014 | Gillen |
| 2014/0330407 A1 | 11/2014 | Corder et al. |
| 2015/0058163 A1 | 2/2015 | Lenahan et al. |
| 2015/0106291 A1 | 4/2015 | Robinson et al. |
| 2015/0106292 A1 | 4/2015 | Robinson et al. |
| 2015/0106293 A1 | 4/2015 | Robinson et al. |
| 2015/0106294 A1 | 4/2015 | Robinson et al. |
| 2015/0106295 A1 | 4/2015 | Robinson et al. |
| 2015/0106296 A1 | 4/2015 | Robinson et al. |
| 2015/0120602 A1 | 4/2015 | Huffman et al. |
| 2015/0138382 A1 | 5/2015 | Xiao et al. |
| 2015/0193731 A1 | 7/2015 | Stevens et al. |
| 2016/0071051 A1 | 3/2016 | Tibbs et al. |
| 2016/0140486 A1 | 5/2016 | Tibbs et al. |
| 2016/0140487 A1 | 5/2016 | Tibbs et al. |
| 2016/0148154 A1 | 5/2016 | Tibbs et al. |
| 2016/0189466 A1 | 6/2016 | Gibson et al. |
| 2018/0060800 A1 | 3/2018 | Robinson |
| 2018/0060812 A1 | 3/2018 | Robinson et al. |

FOREIGN PATENT DOCUMENTS

| | | |
|---|---|---|
| CN | 1666214 A | 9/2005 |
| CN | 1795461 A | 6/2006 |
| CN | 101203873 A | 6/2008 |
| CN | 101329752 A | 12/2008 |
| CN | 101971201 A | 2/2011 |
| CN | 102609783 A | 7/2012 |
| CN | 102930655 A | 2/2013 |
| CN | 202720725 A | 2/2013 |
| EP | 1365198 A1 | 11/2003 |
| EP | 2469291 A1 | 6/2012 |
| JP | S62121108 A | 7/1987 |
| JP | 5-211684 A | 8/1993 |
| JP | 10-207956 A | 8/1998 |
| JP | 11-139540 A | 5/1999 |
| JP | H11151154 A | 6/1999 |
| JP | 2000-339373 A | 12/2000 |
| JP | 2001-014393 A | 1/2001 |
| JP | 2001-022678 A | 1/2001 |
| JP | 2001291027 A | 10/2001 |
| JP | 2001338030 A | 12/2001 |
| JP | 2002-042008 A | 2/2002 |
| JP | 2002-056307 A | 2/2002 |
| JP | 200292505 A | 3/2002 |
| JP | 2002-109409 A | 4/2002 |
| JP | 2002157541 A | 5/2002 |
| JP | 2002259553 A | 9/2002 |
| JP | 2002288562 A | 10/2002 |
| JP | 2003196354 A | 7/2003 |
| JP | 2003263599 A | 9/2003 |
| JP | 2003321124 A | 11/2003 |
| JP | 2004-30159 A | 1/2004 |
| JP | 2004280468 A | 10/2004 |
| JP | 2004338824 A | 12/2004 |
| JP | 2005-043974 A | 2/2005 |
| JP | 2006-512635 A | 4/2006 |
| JP | 2006277199 A | 10/2006 |
| JP | 2007153618 A | 6/2007 |
| JP | 2008303069 A | 12/2008 |
| JP | 2010128535 A | 6/2010 |
| JP | 2011118611 A | 6/2011 |
| JP | 2012138000 A | 7/2012 |
| WO | WO 00/19170 A1 | 4/2000 |
| WO | WO 00/19171 A1 | 4/2000 |
| WO | WO 00/30014 A1 | 5/2000 |
| WO | WO 00/46726 A2 | 8/2000 |
| WO | WO 00/46728 A2 | 8/2000 |
| WO | WO 00/52422 A1 | 9/2000 |
| WO | 01/08071 A1 | 2/2001 |
| WO | 0120423 A2 | 3/2001 |
| WO | WO 01/16889 A1 | 3/2001 |
| WO | WO 01/29778 A1 | 4/2001 |
| WO | WO 01/35344 A2 | 5/2001 |
| WO | WO 01/39031 A2 | 5/2001 |
| WO | WO 01/65451 A1 | 9/2001 |
| WO | WO 01/65454 A2 | 9/2001 |
| WO | WO 01/65523 A1 | 9/2001 |
| WO | WO 01/65524 A1 | 9/2001 |
| WO | WO 01/67344 A1 | 9/2001 |
| WO | WO 01/72109 A2 | 10/2001 |
| WO | WO 01/84359 A2 | 11/2001 |
| WO | WO 01/88831 A2 | 11/2001 |
| WO | WO 01/97101 A2 | 12/2001 |
| WO | WO 02/07104 A1 | 1/2002 |
| WO | WO 02/17045 A2 | 2/2002 |
| WO | WO 02/052378 A2 | 7/2002 |
| WO | WO02073369 | 9/2002 |
| WO | WO02080436 | 10/2002 |
| WO | WO03023688 | 3/2003 |
| WO | 03040979 A1 | 5/2003 |
| WO | WO 2004/015518 A2 | 2/2004 |
| WO | 2004042523 A2 | 5/2004 |
| WO | 2007055769 A2 | 5/2007 |
| WO | WO 2010/123611 A1 | 10/2010 |
| WO | 2011/074500 A1 | 6/2011 |
| WO | WO 20121129529 A1 | 9/2012 |
| WO | WO 20131106940 A1 | 7/2013 |
| WO | 2014031691 A2 | 2/2014 |
| WO | WO14164853 | 10/2014 |

OTHER PUBLICATIONS

Pender, Lee, Hard Times Are the Best Times, Magazine, Aug. 15, 2001 (Retrieved on Apr. 25, 2003), p. 3, Paragraph 3, Retrieved from the Internet: <URL:http://www.cio.com/archive/081501/besttimes_content.html>.

Raco Industries, "Increase Delivery Visibility and Simplify Your Process," retrieved from <http://www.racointeractive.com/media/834/raco_interactive-pd.pdf>, on Sep. 25, 2013, 2 pages.

Related Case—U.S. Appl. No. 14/170,298, filed Jan. 31, 2014, entitled Systems and Methods for Parcel Delivery to Alternate Delivery Locations.

Related Case—U.S. Appl. No. 14/199,787, filed Mar. 6, 2014, entitled Systems and Methods of Delivering Parcels using Attended Delivery/Pickup Locations.

Related Case—U.S. Appl. No. 14/199,830, filed Mar. 6, 2014, entitled Systems and Methods of Suggesting Attended Delivery/Pickup Locations.

Related Case—U.S. Appl. No. 14/200,267, filed Mar. 7, 2014, entitled Systems and Methods of Reserving Space Attended Delivery/Pickup Locations.

Related Case—U.S. Appl. No. 14/200,301, filed Mar. 7, 2014, entitled Systems and Methods of Managing the Capacity of Attended Delivery/Pickup Locations.

Related Case—U.S. Appl. No. 14/200,328, filed Mar. 7, 2014, entitled Systems and Methods of Flexibly Activating Temporary Attended Delivery/Pickup Locations.

Written Opinion of the International Searching Authority, dated Nov. 25, 2014, from corresponding International Application Serial No. PCT/US2014/023665,.

(56) References Cited

OTHER PUBLICATIONS

Related Case—U.S. Appl. No. 14/200,528, filed Mar. 7, 2014, entitled Systems and Methods of Managing Item Pickup at Attended Delivery/Pickup Locations.
Related Case—U.S. Appl. No. 14/200,681, filed Mar. 7, 2014, entitled Systems and Methods of Managing Signatures of Documents.
Related Case—U.S. Appl. No. 14/200,724, filed Mar. 7, 2014, entitled Systems and Methods for Returning Items to Attended Delivery/Pickup Locations.
Related Case—U.S. Appl. No. 14/201,029, filed Mar. 7, 2014, entitled Systems and Methods of Managing Item Pickup at Attended Delivery/Pickup Locations.
Related Case—U.S. Appl. No. 14/201,114, filed Mar. 7, 2014, entitled Systems and Methods of Locating and Selling Items at Attended Delivery/Pickup Locations.
Related Case—U.S. Appl. No. 14/201,241, filed Mar. 7, 2014, entitled Systems and Methods for Defining Attributes of Attended Delivery/Pickup Locations.
Related Case—U.S. Appl. No. 14/201,306, filed Mar. 7, 2014, entitled Systems and Methods for Determining Charges Related to the Delivery of a Parcel.
Related Case—U.S. Appl. No. 14/201,354, filed Mar. 7, 2014, entitled Systems and Methods for Ranking Potential Attended Delivery/Pickup Locations.
Related Case—U.S. Appl. No. 14/514,000, filed Oct. 14, 2014, entitled Systems and Methods for Conveying a Parcel to a Consignee, for Example, After an Unsuccessful Delivery Attempt.
Related Case—U.S. Appl. No. 14/514,155, filed Oct. 14, 2014, entitled Systems and Methods for Facilitating Delivery of a Parcel to a Suitably Sized Locker.
Related Case—U.S. Appl. No. 14/514,228, filed Oct. 14, 2014, entitled Systems and Methods for Establishing an Account of a User at a Locker Bank.
Related Case—U.S. Appl. No. 14/514,276, filed Oct. 14, 2014, entitled Systems and Methods for Confirming an Identity of an Individual, for Example, at a Locker Bank.
Related Case—U.S. Appl. No. 14/561,041, filed Dec. 4, 2014, entitled Systems and Methods for Confirming an Identity of an Individual, for Example, at a Locker Bank.
Related Case—U.S. Appl. No. 14/561,062, filed Dec. 4, 2014, entitled Systems and Methods for Conveying a Parcel to a Consignee, for Example, After an Unsuccessful Delivery Attempt.
SEP leads €26 million funding round for Kiala, http://www.sep.co.uk/news/story/sep-leads-e26-million-funding-round-for-kiala-2/, Nov. 30, 2007, SEP Scottish Equity Partners.
Van Huzien, Gordon, Messaging: The Transport Part of The XML Puzzle, Article, Jul. 2000 (Retrieved from the Internet Apr. 25, 2003: <URL:http://www-106.ibm.com/developerworks/library/xml-messaging/>.
Written Opinion of the International Searching Authority, dated Apr. 22, 2015, from corresponding International Application Serial No. PCT/US2014/023538.
Written Opinion of the International Searching Authority, dated Dec. 22, 2014, from corresponding International Application Serial No. PCT/US2014/023649.
Written Opinion of the International Searching Authority, dated Dec. 31, 2014, from corresponding International Application Serial No. PCT/US2014/023658.
Written Opinion of the International Searching Authority, dated Dec. 4, 2014, from corresponding International Application Serial No. PCT/US2014/023638.
Written Opinion of the International Searching Authority, dated Dec. 8, 2014, from corresponding International Application Serial No. PCT/US2014/023629.
Written Opinion of the International Searching Authority, dated Dec. 9, 2014, from corresponding International Application Serial No. PCT/US2014/023583.

Written Opinion of the International Searching Authority, dated Feb. 17, 2015, from corresponding International Application Serial No. PCT/US2014/060525.
Written Opinion of the International Searching Authority, dated Feb. 3, 2015, from corresponding International Application Serial No. PCT/US2014/060482.
Written Opinion of the International Searching Authority, dated Feb. 3, 2015, from corresponding International Application Serial No. PCT/US2014/060503.
Written Opinion of the International Searching Authority, dated Feb. 4, 2015, from corresponding International Application Serial No. PCT/US2014/060517.
Written Opinion of the International Searching Authority, dated Jan. 6, 2015, from corresponding International Application Serial No. PCT/US2014/023610.
Written Opinion of the International Searching Authority, dated Jun. 10, 2015, from corresponding International Application Serial No. PCT/US2014/023554.
Written Opinion of the International Searching Authority, dated Jun. 15, 2015, from corresponding International Application Serial No. PCT/US2014/023643.
Written Opinion of the International Searching Authority, dated Jun. 9, 2015, from corresponding International Application Serial No. PCT/US2014/023597.
Written Opinion of the International Searching Authority, dated Nov. 17, 2014, from corresponding International Application Serial No. PCT/US2014/014280.
Written Opinion of the International Searching Authority, dated Nov. 25, 2014, from corresponding International Application Serial No. PCT/US2014/023575.
PCT International Preliminary Report on Patentability, dated Jul. 10, 2015, from corresponding International Application Serial No. PCT/US2014/023610.
PCT International Preliminary Report on Patentability, dated Sep. 24, 2015, from corresponding International Application No. PCT/US2014/023554.
PCT International Preliminary Report on Patentability, dated Sep. 24, 2015, from corresponding International Application Serial No. PCT/US2014/023643.
PCT International Preliminary Report on Patentability, dated Oct. 8, 2015, from corresponding International Application Serial No. PCT/US2014/023538.
PCT International Preliminary Report on Patentability, dated Nov. 12, 2015, from corresponding International Application Serial No. PCT/US2014/060517.
PCT International Search Report, dated Jul. 8, 2015, from corresponding International Application Serial No. PCT/US2014/030530.
PCT International Search Report, dated Jul. 8, 2015, from corresponding International Application Serial No. PCT/US2014/030518.
Written Opinion of the International Searching Authority, dated Jul. 8, 2015, from corresponding International Application Serial No. PCT/US2014/030518.
Written Opinion of the International Searching Authority, dated Jul. 8, 2015, from corresponding International Application Serial No. PCT/US2014/030530.
Final Office Action, dated Oct. 29, 2015, from corresponding U.S. Appl. No. 14/201,354.
Office Action, dated Aug. 20, 2015, from corresponding U.S. Appl. No. 14/210,813.
Office Action, dated Oct. 16, 2015, from corresponding U.S. Appl. No. 14/200,528.
Office Action, dated Nov. 18, 2015, from corresponding U.S. Appl. No. 14/210,689.
Final Office Action, dated Sep. 10, 2015, from corresponding U.S. Appl. No. 14/561,062.
Final Office Action, dated Sep. 15, 2015, from corresponding U.S. Appl. No. 14/561,041.
Final Office Action, dated Oct. 22, 2015, from corresponding U.S. Appl. No. 14/200,301.
Final Office Action, dated Nov. 27, 2015, from corresponding U.S. Appl. No. 14/199,830.

(56) References Cited

OTHER PUBLICATIONS

Final Office Action, dated Oct. 23, 2015, from corresponding U.S. Appl. No. 14/170,298.
Office Action, dated Dec. 18, 2015, from corresponding U.S. Appl. No. 14/514,155.
Office Action dated Jan. 14, 2016, from corresponding U.S. Appl. No. 14/200,328.
PCT International Search Report, dated Jan. 28, 2016, from corresponding International Application Serial No. PCT/US2014/023618.
Written Opinion of the International Searching Authority, dated Jan. 28, 2016, from corresponding International Application Serial No. PCT/US2014/023618.
PCT International Preliminary Report on Patentability, dated Jan. 19, 2016, from corresponding International Application Serial No. PCT/US2014/023597.
PCT International Preliminary Report on Patentability, dated Apr. 28, 2016, from corresponding International Application Serial No. PCT/US2014/060482.
PCT International Search Report, dated May 2, 2016, from corresponding International Application Serial No. PCT/US2015/0060757.
Written Opinion of the International Searching Authority, dated May 2, 2016, from corresponding International Application Serial No. PCT/US2015/0060757.
ASP V16-System Walker List Works Manual (relevant part); p. 88, line 5, 3.4 Start up and termination of ListWORKS writer; one page.
Brewin, Bob and Rosencrance, Linda, Follow That Package!, Article, Mar. 19, 2001 (Retrieved from the Internet Apr. 25, 2003), p. 1-p. 5, Retrieved from the Internet: URL:http://www.computerworld.com./printthis/2001/0,4814,58696,00.html, Computer World.
Caminiti et al., United Parcel Service Introduces Advanced Label Imaging System, Published by Business Wire on Nov. 29, 1989, Section 1, p. 1, Downloaded from the Internet on Sep. 19, 2005, 2 Pages.
De Marco, Donna, E-Tail Presents Can Be Tougher to Send Back Than Order, Journal, Dec. 28, 1999, Downloaded from the Internet on Oct. 3, 2002, Accession No. 08891512, Knight-Ridder/Tribune Business News, The Dialog Corporation, United States.
Descartes, Scheduling Software Helps Webvan Meet 30-Minute Delivery Window, www.stores.org, Jul. 2000.
El Portal Del Transporte, FedEx Insight Empowers Customers with Enhanced Shipment Visibility and Control, Article, Apr. 11, 2001 (Retrieved on Apr. 25, 2003), p. 9, Paragraph 4- p. 10, Line 7, Retrieved from the Internet: <URL:http://www.transportando.net/newsabril_completa.htm>.
FedEx, "RPS Adds Automated Package Pick-Up to Redesigned Web Site," vvww.fedex.com/us/about/gound/pressreleases/pressrelease111198.html?link=4, retrieved Sep. 10, 2003.
FedEx, "FedEx Mobile Ship", retrieved from <http://www.fedex.com/us/mobile/label.html, redirected to http://mobilesolutions.fedex.com/shipping-label.html > on Sep. 25, 2013, 2 pages.
Frontline Solutions, FedEx Improves Internal, External Operations, Article, Apr. 5, 2001 (Retrieved from the Internet Apr. 25, 2003), p. 1 (last line) through p. 2, Paragraph 9, Retrieved from the Internet: <URL:http://www.frontlinemagazine.com/art_th/o4052001.htx>, Fairfax, Virginia and Memphis, Tennessee.
Gao, Huiji, et al., "Cyber-Physical-Social Systems: Harnessing the Crowdsourcing Power of Social Media for Disaster Relief", IEEE Intelligent Systems, Copyright 2011, pp. 10-14, IEEE Computer Society.
Harrington, Lisa, The U.S. Postal Service Gets Serious About Serving Business in the New Economy, Journal, May 2000, Downloaded from the Internet on Oct. 3, 2002, p. 2, vol. 41, No. 5, Accession No. 01167257, Penton Publishing, Inc., United States of America.
Henderson, Timothy, Buy.com Boosts Returns Process Efficiency With New Solution, Periodical, Nov. 2000, Downloaded from the Internet on Oct. 3, 2002, pp. 72-76, vol. 82n11, Accession No. 02102731, ProQuest Info&Learning, United States of America.

iPventure, "Schedule Distribution Routes and Timeslots," http://wvvw.ipventure.com/onlineorder/distribution.php, retrieved on Apr. 16, 2008.
Kihon Kara Jissen Made Business Seikou No Tameno Kanpeki Guide—How to E-Commerce (relevant part); p. 60; one page.
Lindsay, Bruce R., "Congressional Research Service, Social Media and Disasters: Current Uses, Future Options, and Policy Considerations," CRS Report for Congress, Sep. 6, 2011, 10 pages, Congressional Research Service.
Many Happy Returns—UPS Unvels Advanced Outline Returns Solution, Journal, Sep. 20, 2000, Downloaded from the Internet on Oct. 3, 2002, Accession No. 12921102, Business Wire, United States of America.
Office Action, dated Apr. 24, 2015, from corresponding U.S. Appl. No. 14/201,354.
Office Action, dated Feb. 23, 2015, from corresponding U.S. Appl. No. 14/561,041.
Office Action, dated Jan. 28, 2015, from corresponding U.S. Appl. No. 14/201,241.
Office Action, dated Jun. 17, 2015, from corresponding U.S. Appl. No. 14/200,301.
Office Action, dated Jun. 24, 2015, from corresponding U.S. Appl. No. 14/199,830.
Office Action, dated Mar. 11, 2015, from corresponding U.S. Appl. No. 14/561,062.
Office Action, dated May 4, 2015, from corresponding U.S. Appl. No. 14/170,298.
PCT International Search Report, dated Nov. 25, 2014, from corresponding International Application Serial No. PCT/US2014/023665.
Outlook 2000 Handbook First Edition (relevant part); p. 95, last 9 lines; one page.
PCT International Preliminary Report on Patentability, dated Apr. 22, 2015, from corresponding International Application Serial No. PCT/US2014/023649.
PCT International Preliminary Report on Patentability, dated Apr. 23, 2015, from corresponding International Application Serial No. PCT/US2014/023665.
PCT International Preliminary Report on Patentability, dated Jun. 17, 2015, from corresponding International Application Serial No. PCT/US2014/023575.
PCT International Preliminary Report on Patentability, dated Jun. 5, 2015, from corresponding International Application Serial No. PCT/US2014/023658.
PCT International Preliminary Report on Patentability, dated May 14, 2015, from corresponding International Application Serial No. PCT/US2014/014280.
PCT International Preliminary Report on Patentability, dated May 22, 2015, from corresponding International Application Serial No. PCT/US2014/023629.
PCT International Preliminary Report on Patentability, dated May 22, 2015, from corresponding International Application Serial No. PCT/US2014/023638.
PCT International Preliminary Report on Patentability, dated May 8, 2015, from corresponding International Application Serial No. PCT/US2014/023583.
PCT International Search Report, dated Apr. 22, 2015, from corresponding International Application Serial No. PCT/US2014/023538.
PCT International Search Report, dated Dec. 22, 2014, from corresponding International Application Serial No. PCT/US2014/023649.
PCT International Search Report, dated Dec. 31, 2014, from corresponding International Application Serial No. PCT/US2014/023658.
PCT International Search Report, dated Dec. 4, 2014, from corresponding International Application Serial No. PCT/US2014/023638.
PCT International Search Report, dated Dec. 8, 2014, from corresponding International Application Serial No. PCT/US2014/023629.

(56) References Cited

OTHER PUBLICATIONS

PCT International Search Report, dated Dec. 9, 2014, from corresponding International Application Serial No. PCT/US2014/023583.
PCT International Search Report, dated Feb. 17, 2015, from corresponding International Application Serial No. PCT/US2014/060525.
PCT International Search Report, dated Feb. 3, 2015, from corresponding International Application Serial No. PCT/US2014/060482.
PCT International Search Report, dated Feb. 3, 2015, from corresponding International Application Serial No. PCT/US2014/060503.
PCT International Search Report, dated Feb. 4, 2015, from corresponding International Application Serial No. PCT/US2014/060517.
PCT International Search Report, dated Jan. 6, 2015, from corresponding International Application Serial No. PCT/US2014/023610.
PCT International Search Report, dated Jun. 10, 2015, from corresponding International Application Serial No. PCT/US2014/023554.
PCT International Search Report, dated Jun. 15, 2015, from corresponding International Application Serial No. PCT/US2014/023643.
PCT International Search Report, dated Jun. 9, 2015, from corresponding International Application Serial No. PCT/US2014/023597.
PCT International Search Report, dated Nov. 17, 2014, from corresponding International Application Serial No. PCT/US2014/014280.
PCT International Search Report, dated Nov. 25, 2014, from corresponding International Application Serial No. PCT/US2014/023575.
Singapore Search Report and Written Opinion dated Jun. 7, 2016 in Singapore Patent Application No. 11201507536Q, 10 pages.
European Search Report dated Sep. 9, 2016 in European Patent Application No. 14726224.0, 9 pages.
European Search Report dated Sep. 22, 2016 in European Patent Application No. 14719421.1, 7 pages.
European Search Report dated Sep. 23, 2016 in European Patent Application No. 14716127.7, 8 pages.
European Search Report dated Sep. 30, 2016 in European Patent Application No. 14717282.9, 7 pages.
Canadian Office Action dated Oct. 11, 2016 in Canadian Patent Application No. 2,900,041, 4 pages.
Canadian Office Action dated Oct. 12, 2016 in Canadian Patent Application No. 2,905.338, 4 pages.
International Search Report and Written Opinion dated Sep. 13, 2016 in International Application No. PCT/US14/23565, 12 pages.
International Preliminary Report on Patentability dated Oct. 6, 2016 in International Application No. PCT/US2014/023565, 7 pages.
Non-Final Office Action dated Aug. 15, 2016 in U.S. Appl. No. 14/201,354, 18 pages.
Non-Final Office Action dated Sep. 6, 2016 in U.S. Appl. No. 14/200,724, 13 pages.
Non-Final Office Action dated Sep. 7, 2016 in U.S. Appl. No. 14/201,306, 13 pages.
Non-Final Office Action dated Sep. 14, 2016 in U.S. Appl. No. 14/200,267, 18 pages.
Non-Final Office Action dated Sep. 23, 2016 in U.S. Appl. No. 14/199,830, 17 pages.
Final Office Action dated Oct. 7, 2016 in U.S. Appl. No. 14/200,528, 30 pages.
Final Office Action dated Oct. 20, 2016 in U.S. Appl. No. 14/514,155, 18 pages.
Non-Final Office Action received for U.S. Appl. No. 14/514,155, dated Sep. 28, 2018, 29 pages.
Notice of Allowance received for U.S. Appl. No. 14/514,276, dated Oct. 3, 2018, 11 pages.
Non-Final Office Action received for U.S. Appl. No. 14/942,757, dated Jul. 19, 2018, 25 pages.
Non-Final Office Action received for U.S. Appl. No. 14/514,228, dated Nov. 30, 2018, 45 pages.
Final Office Action received for U.S. Appl. No. 14/514,000, dated Feb. 12, 2018, 43 pages.
International Preliminary Report on Patentability received for PCT Patent Application No. PCT/US2014/060525, completed on Dec. 10, 2015, 12 pages.
Non-Final Office Action received for U.S. Appl. No. 14/514,155, dated Jun. 11, 2018, 23 pages.
Non-Final Office Action received for U.S. Appl. No. 14/935,257, dated Apr. 20, 2017, 16 pages.
Non-Final Office Action received for U.S. Appl. No. 14/200,681, dated Jul. 25, 2016, 17 pages.
Office Action received for European Patent Application No. 14714534.6, dated May 26, 2017, 5 pages.
Office Action received for Japanese Patent Application No. 2016-501276, dated Nov. 1, 2016, 8 pages (4 pages of English Translation and 4 pages of Official Copy).
Office Action received for Japanese Patent Application No. 2016-501288, dated Nov. 1, 2016, 7 pages (3 pages of English Translation and 4 pages of Official Copy).
Search Report and Written Opinion received for Singapore Patent Application No. 11201507531R, dated Jun. 27, 2016, 11 pages.
Search Report and Written Opinion received for Singapore Patent Application No. 11201507549S, dated May 31, 2016, 11 pages.
Summons to Attend Oral Proceedings received for European Patent Application No. 14854011.5, dated Apr. 3, 2018, 13 pages.
Office Action received for Canadian Patent Application No. 2,905,338, dated Oct. 2, 2018, 8 pages.
McNamara, Paul, "'Doorman' Kiosk Accepts Package Deliveries When You're Not Home", Network world, Available at: <https://www.networkworld.com/article/2348365/data-center/-doorman--kiosk-accepts-package-deliveries-when-you-re-not-home.html>, Aug. 8, 2007, 4 pages.
Notice of Allowance received for Singapore Patent Application No. 11201507531R, dated Jul. 19, 2018, 7 pages.
Final Office Action received for U.S. Appl. No. 14/942,757, dated Mar. 21, 2019, 26 pages.

\* cited by examiner

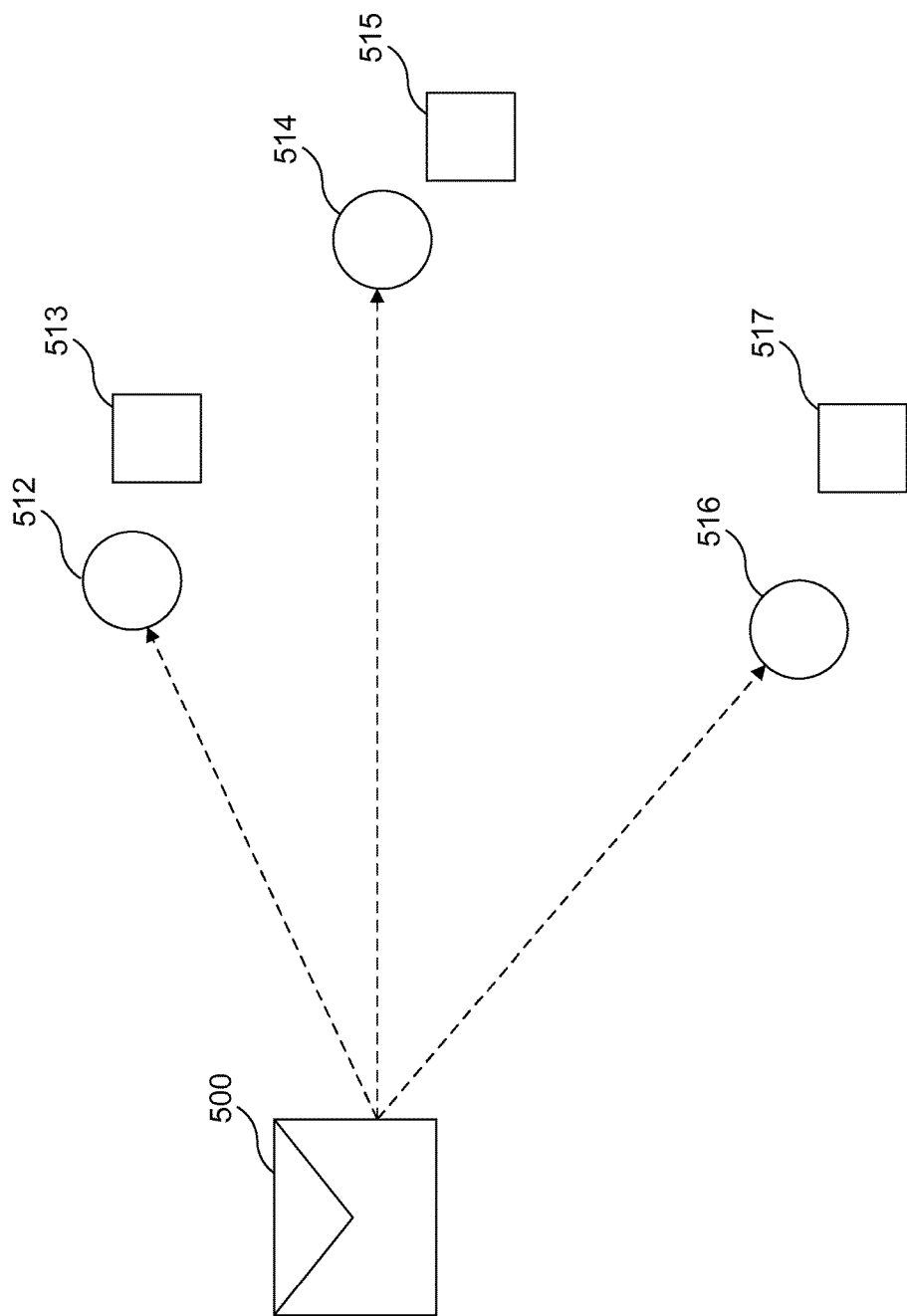

us 10,339,492 B2

SYSTEMS AND METHODS OF RE-ROUTING PARCELS INTENDED FOR DELIVERY TO ATTENDED DELIVERY/PICKUP LOCATIONS

CROSS REFERENCE TO RELATED APPLICATION

This application claims the benefit of U.S. Provisional Patent Application No. 61/791,008, filed Mar. 15, 2013, entitled, "Systems and Methods of Delivering Parcels Using Attended Delivery Locations," and U.S. Provisional Application No. 61/777,968, filed Mar. 12, 2013, entitled, "Systems and Methods of Delivering Parcels Using Attended Delivery Locations," which are hereby incorporated herein by reference in their entirety.

BACKGROUND

People and businesses may desire convenient ways to send and receive parcels or other items, such as items that those people have purchased or items of inventory that those businesses may offer for sale. Logistics companies and other common carriers may desire more efficient ways to deliver parcels to customers. Accordingly, there is a need for improved systems and methods that address these issues.

SUMMARY

A computer-implemented method, according to various embodiments, comprises: (1) determining, by a processor whether a particular attended delivery/pickup location to which a parcel is being directed has an ability to accept the parcel; and (2) in response to determining that the particular attended delivery/pickup location does not have the ability to accept the parcel, facilitating, by a processor, an adjustment of delivery of the parcel. In particular embodiments, the facilitation is selected from the group consisting of: (1) facilitating, by a processor, a redirection of the parcel to an alternate attended delivery/pickup location; (2) facilitating, by a processor, a delay of delivery of the parcel to the attended delivery/pickup location to a later time; and (3) facilitating, by a processor, delivery of the parcel to an address associated with a parcel recipient.

A computer system, according to various embodiments, comprises at least one processor. In particular embodiments, the computer system is configured for: (1) receiving an indication that one or more parcels are scheduled for delivery from a first location to a first attended delivery/pickup location, the one or more parcels having an intended recipient; (2) determining whether the first attended delivery/pickup location has capacity to accept delivery of the one or more parcels; (3) at last partially in response to determining that the first attended delivery/pickup location does not have capacity to accept delivery of the one or more parcels: notifying the user of the lack of capacity; and providing, to the intended recipient, a selection of one or more re-routing options. In various embodiments, the one or more re-routing options are selected from the group consisting of: (1) re-routing the one or more parcels to a second attended delivery/pickup location; (2) delaying a delivery of the one or more parcels to the first attended delivery/pickup location at least until the first attended delivery/pickup location has the capacity to accept delivery of the one or more parcels; and (3) re-routing the one or more parcels to an address associated with the user. In particular embodiments, the system is further configured for: (1) at least partially in response to providing the selection of the one or more re-routing options, receiving a selection of one of the one or more re-routing options from the user; and (2) re-routing the one or more parcels based at least in part on the selected one or more re-routing options.

A non-transitory computer-readable medium, according to various embodiments, stores computer-executable instructions for: (1) receiving, from a user, one or more parcel handling preferences; (2) receiving an indication that one or more parcels are scheduled for delivery from a first location to a first attended delivery/pickup location, wherein the user is an intended recipient of the one or more parcels; (3) determining whether the first attended delivery/pickup location has capacity to accept delivery of the one or more parcels; (4) at least partially in response to determining that the first attended delivery/pickup location does not have capacity to accept delivery of one or more parcels, re-routing the parcel based at least in part on the one or more parcel handling preferences; (5) at least partially in response to the re-routing, facilitating delivery of the one or more parcels to a second location; and (6) notifying the user of the re-routing.

BRIEF DESCRIPTION OF THE DRAWINGS

Various embodiments of a system and method for delivering parcels to attended delivery/pickup locations are described below. In the course of this description, reference will be made to the accompanying drawings, which are not necessarily drawn to scale, and wherein:

FIG. 5 is a transportation diagram depicting exemplary transportation paths that may be taken by parcels that are delivered to and/or from attended delivery/pickup locations according to various embodiments.

DETAILED DESCRIPTION

Various embodiments now will be described more fully hereinafter with reference to the accompanying drawings. It should be understood that the invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Overview

Logistics networks, according to various embodiments, use attended pickup and delivery locations to facilitate: (1) the convenient delivery of parcels and other items to individuals; and/or (2) the convenient pickup of parcels and other items from individuals who wish to send those items to others via a common carrier. In various embodiments, existing retail businesses may be used as suitable delivery/pickup locations. For example, a gas station, a convenience store, a flower shop, a magazine stand, a retail location associated with a common carrier, a kiosk at a mall, or a retail department store may enter into an agreement with a common carrier to accept deliveries of parcels (and/or other items) that are to be picked up later, at a convenient time, by the intended recipient of the parcels or other items. The retail location may also agree to serve as a drop-off point for parcels and/or other items that are to be delivered to another location by the carrier.

Figure 1:
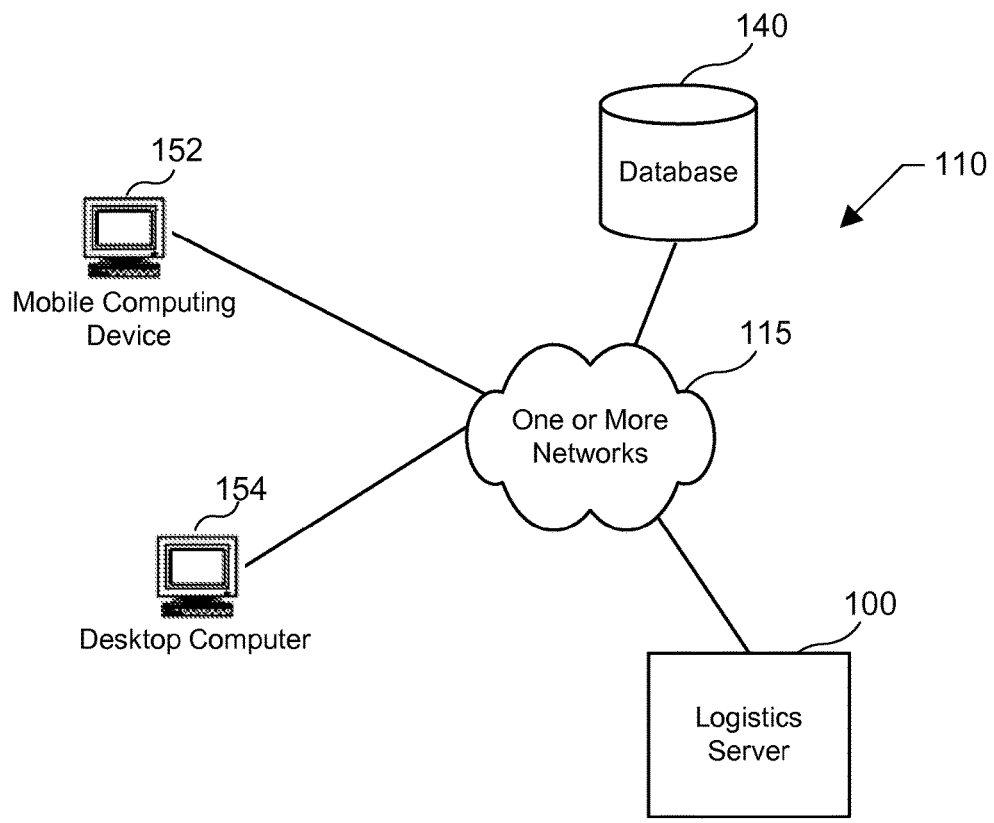
FIG. 1 is a block diagram of a logistics system in accordance with an embodiment of the present system.

In certain embodiments, each attended delivery/pickup location is manned for at least some time during the week and is equipped with a computer system that is adapted to communicate both with: (1) one or more computer systems associated with the common carrier; (2) one or more computing devices associated with the sender of the parcel; and (3) one or more computing devices associated with the recipient of the parcel. An example of a suitable computer system is shown in FIG. 1 and is described in greater technical detail at the end of this document.

In particular embodiments, a computer at the attended delivery/pickup location (e.g., an "attended delivery/pickup location computer") is adapted to send suitable messages regarding the status of parcels handled by the attended delivery/pickup location. For example, when the attended delivery/pickup location receives a parcel, the attended delivery/pickup location computer may automatically transmit an e-mail, text, or other message to: (1) the common carrier's computer system; (2) the recipient's computing device; and/or (3) the sender's computing device indicating that the parcel has been received by the attended delivery/pickup location and is ready to be picked up by the recipient. The message may also include other suitable information, such as the name and location of the attended delivery/pickup location, the days and hours of operation of the attended delivery/pickup location, and the deadline by which the individual must retrieve the parcel before, for example: (1) the item is returned to the sender; or (2) the recipient is charged for late pickup of the item.

The attended delivery/pickup location may also automatically transmit an e-mail, text, or other message to: (1) the common carrier's computer system; (2) the recipient's computing device; (3) the sender's computing device; and/or (4) any other suitable computer in response to any suitable event including, for example: (1) the parcel being picked up by the individual; (2) the parcel being returned to the carrier after a time period for retrieving the parcel has passed; (3) the parcel being transferred to another attended delivery/pickup location; or (4) any other suitable event.

In various embodiments, the system may be configured to facilitate the delivery of parcels directly to attended delivery/pickup locations from, for example, e-commerce retailers from which users may order items for delivery. For example, the system may be configured to allow a user making purchases of items via the Internet to have those items delivered directly to attended delivery/pickup locations. In such embodiments, as well as in other embodiments, the system may be configured to present users with a selection of attended delivery/pickup locations for items that the user orders.

In particular embodiments, the system may be configured to present users with attended delivery/pickup location options based at least in part on any of the following: (1) a location of the user's home; (2) a location of the user's place of work; (3) any location specified by the user (e.g., such as a location that the user frequently visits); and/or (4) any other suitable metric for determining an appropriate selection of attended delivery/pickup locations to present to the user. In various embodiments, the system may be configured to provide a selection of attended delivery/pickup locations that are: (1) within a particular distance of any of the locations described above; (2) open (e.g., are available for picking up parcels) at a time convenient to the user; (3) have certain hours of operation; and/or (4) any other factor that may be beneficial to the user or common carrier in dropping off or picking up parcels from attended delivery/pickup locations.

In various embodiments, the system is configured to confirm whether an attended delivery/pickup location has capacity to accept a parcel before directing (e.g., or redirecting) a parcel to the attended delivery/pickup location or before presenting the alternate location as a potential delivery location to a customer. This may include, for example, ensuring that there is enough physical space at the attended delivery/pickup location to accept the parcel or suitable systems in place at the attended delivery/pickup location to accommodate any special handling instructions that the parcel containing the item may have (e.g., a requirement to store the parcel at a particular temperature). In such embodiments, the system may be further configured to substantially automatically (e.g., automatically) reserve space at the attended delivery/pickup location for the parcel to ensure that the attended delivery/pickup location will not lose capacity to accept the parcel before the parcel arrives.

In embodiments in which the system determines that a particular attended delivery/pickup location is not available to accept delivery of a parcel scheduled for delivery at the attended delivery/pickup location, the system may be configured to: (1) redirect the parcel to an alternate attended delivery/pickup location; (2) facilitate a delay of delivery of the parcel to the attended delivery/pickup location; (3) facilitate delivery of the parcel to an address associated with an intended parcel recipient; (4) provide the intended parcel recipient with a selection of re-routing options; and/or (5) take any other suitable action to redirect the parcel for ultimate delivery to or pickup by the recipient. In various embodiments, the system may be configured to select a re-routing option substantially automatically. In other embodiments, the system may re-route parcels be based at least in part on re-routing preferences provided by one or more parcel recipients. In other embodiments, a re-routing selection is received from the intended parcel recipient or any other suitable user.

The use of such attended delivery/pickup locations may have a variety of different advantages. First, in certain situations, the recipient of a parcel may not typically be home when parcels are commonly delivered. In such situations, it may be useful to have the parcels delivered to an attended location where an individual is available to accept and/or sign for a particular parcel and maintain the parcel in a safe location until the recipient is available to pick up the parcel. As another example, an individual may prefer to have personal deliveries made close to, but not to, their workplace so that they can retrieve the parcels when they are at work. Shipping items directly to attended delivery/pickup locations may also provide a cost savings to common carriers and other shipping and/or logistics companies by avoiding the need to deliver parcels and other items to the home addresses of individual parcel recipients. Rather, the common carriers can deliver parcels to several attended delivery/pickup locations that service a particular area where parcel recipients can go to collect their parcels.

Various additional implementations of attended delivery/pickup locations are described below, after a brief discussion of exemplary technical platforms and computer system architecture that may be used, for example, in implementing various aspects of this concept.

Exemplary Technical Platforms

As will be appreciated by one skilled in the relevant field, the present invention may be, for example, embodied as a computer system, a method, or a computer program product. Accordingly, various embodiments may take the form of an entirely hardware embodiment, an entirely software embodiment, or an embodiment combining software and hardware aspects. Furthermore, particular embodiments may take the form of a computer program product stored on a computer-readable storage medium having computer-readable instructions (e.g., software) embodied in the storage medium. Various embodiments may take the form of web-implemented computer software. Any suitable computer-readable storage medium may be utilized including, for example, hard disks, compact disks, DVDs, optical storage devices, and/or magnetic storage devices.

Various embodiments are described below with reference to block diagrams and flowchart illustrations of methods, apparatuses (e.g., systems) and computer program products. It should be understood that each block of the block diagrams and flowchart illustrations, and combinations of blocks in the block diagrams and flowchart illustrations, respectively, can be implemented by a computer executing computer program instructions. These computer program instructions may be loaded onto a general purpose computer, special purpose computer, or other programmable data processing apparatus to produce a machine, such that the instructions which execute on the computer or other programmable data processing apparatus to create means for implementing the functions specified in the flowchart block or blocks.

These computer program instructions may also be stored in a computer-readable memory that can direct a computer or other programmable data processing apparatus to function in a particular manner such that the instructions stored in the computer-readable memory produce an article of manufacture that is configured for implementing the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of mechanisms for performing the specified functions, combinations of steps for performing the specified functions, and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and other hardware executing appropriate computer instructions.

Example System Architecture

FIG. 1 is a block diagram of a System 110 according to a particular embodiment. As may be understood from this figure, the System 110 includes one or more computer networks 115, a Logistics Server 100, a Database 140, and one or more remote computing devices such as a tablet computer 152, a desktop computer 154, or a mobile computing device 156 (e.g., such as a smart phone, a tablet computer, a wearable computing device, a laptop computer, etc.) In particular embodiments, the one or more computer networks facilitate communication between the Logistics Server 100, Database 140, and one or more remote computing devices 152, 154, 156.

The one or more computer networks 115 may include any of a variety of types of wired or wireless computer networks such as the Internet, a private intranet, a mesh network, a public switch telephone network (PSTN), or any other type of network (e.g., a network that uses Bluetooth or near field communications to facilitate communication between computers). The communication link between Logistics Server 100 and Database 140 may be, for example, implemented via a Local Area Network (LAN) or via the Internet.

Figure 2:
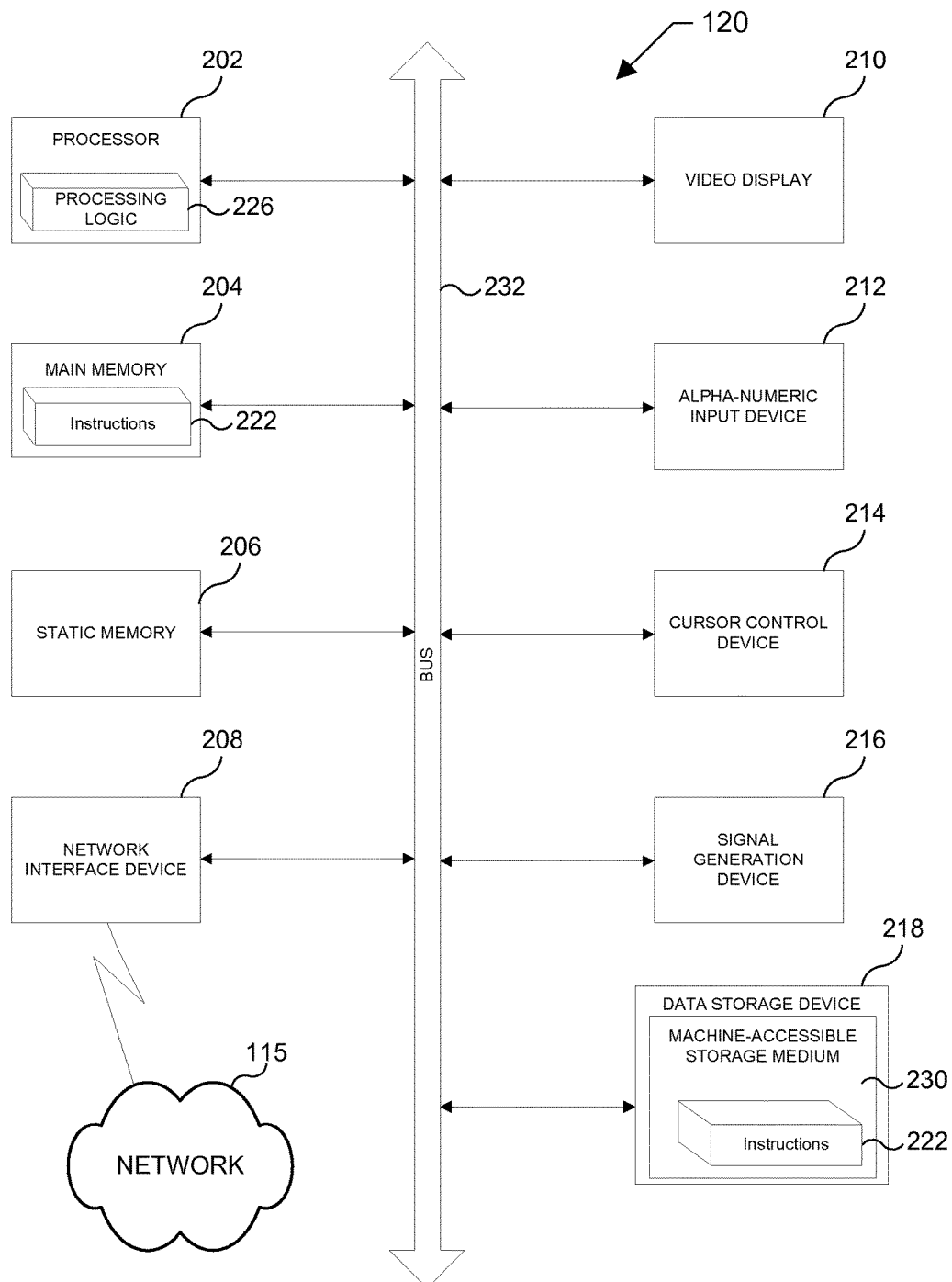
FIG. 2 is a schematic diagram of a computer, such as the logistics server of FIG. 1, that is suitable for use in various embodiments.

FIG. 2 illustrates a diagrammatic representation of a computer architecture 120 that can be used within the System 110, for example, as a client computer (e.g., one of client computers 152, 154, 156 shown in FIG. 1), or as a server computer (e.g., Logistics Server 100 shown in FIG. 1). In particular embodiments, the computer 120 may be suitable for use as a computer within the context of the System 110 that is configured to facilitate the delivery of parcels to attended delivery/pickup locations or facilitate the receipt and/or processing of parcels once they are delivered to the attended delivery/pickup locations.

In particular embodiments, the computer 120 may be connected (e.g., networked) to other computers in a LAN, an intranet, an extranet, and/or the Internet. As noted above, the computer 120 may operate in the capacity of a server or a client computer in a client-server network environment, or as a peer computer in a peer-to-peer (or distributed) network environment. The Computer 120 may be a desktop personal computer (PC), a tablet PC, a set-top box (STB), a Personal Digital Assistant (PDA), a cellular telephone, a web appliance, a server, a network router, a switch or bridge, or any other computer capable of executing a set of instructions (sequential or otherwise) that specify actions to be taken by that computer. Further, while only a single computer is illustrated, the term "computer" shall also be taken to include any collection of computers that individually or jointly execute a set (or multiple sets) of instructions to perform any one or more of the methodologies discussed herein.

An exemplary computer 120 includes a processing device 202, a main memory 204 (e.g., read-only memory (ROM), flash memory, dynamic random access memory (DRAM) such as synchronous DRAM (SDRAM) or Rambus DRAM (RDRAM), etc.), a static memory 206 (e.g., flash memory, static random access memory (SRAM), etc.), and a data storage device 218, which communicate with each other via a bus 232.

The processing device 202 represents one or more general-purpose processing devices such as a microprocessor, a central processing unit, or the like. More particularly, the processing device 202 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. The processing device 202 may also be one or more special-purpose processing devices such as an application specific integrated circuit (ASIC), a field programmable gate array (FPGA), a digital signal processor (DSP), network processor, or the like. The processing device 202 may be configured to execute processing logic 226 for performing various operations and steps discussed herein.

The computer 120 may further include a network interface device 208. The computer 120 also may include a video display unit 210 (e.g., a liquid crystal display (LCD) or a cathode ray tube (CRT)), an alphanumeric input device 212 (e.g., a keyboard), a cursor control device 214 (e.g., a mouse), and a signal generation device 216 (e.g., a speaker).

The data storage device 218 may include a non-transitory computer-accessible storage medium 230 (also known as a non-transitory computer-readable storage medium or a non-transitory computer-readable medium) on which is stored one or more sets of instructions (e.g., software 222) embodying any one or more of the methodologies or functions described herein. The software 222 may also reside, completely or at least partially, within the main memory 204 and/or within the processing device 202 during execution thereof by the computer 120—the main memory 204 and the processing device 202 also constituting computer-accessible storage media. The software 222 may further be transmitted or received over a network 115 via a network interface device 208.

While the computer-accessible storage medium 230 is shown in an exemplary embodiment to be a single medium, the term "computer-accessible storage medium" should be understood to include a single medium or multiple media (e.g., a centralized or distributed database, and/or associated caches and servers) that store the one or more sets of instructions. The term "computer-accessible storage medium" should also be understood to include any medium that is capable of storing, encoding or carrying a set of instructions for execution by the computer and that cause the computer to perform any one or more of the methodologies of the present invention. The term "computer-accessible storage medium" should accordingly be understood to include, but not be limited to, solid-state memories, optical and magnetic media, etc.

Exemplary System Platform

Various embodiments of a system for delivering parcels to attended delivery/pickup locations may be implemented within the context of any suitable logistics service. For example, particular embodiments may be implemented within the context of any suitable logistics service offered by United Parcel Service, Inc. of Atlanta, Ga. Various aspects of the system's functionality may be executed by certain system modules, including a Parcel Delivery Module 300. This module is discussed in greater detail below.

Parcel Delivery Module

Figure 3:
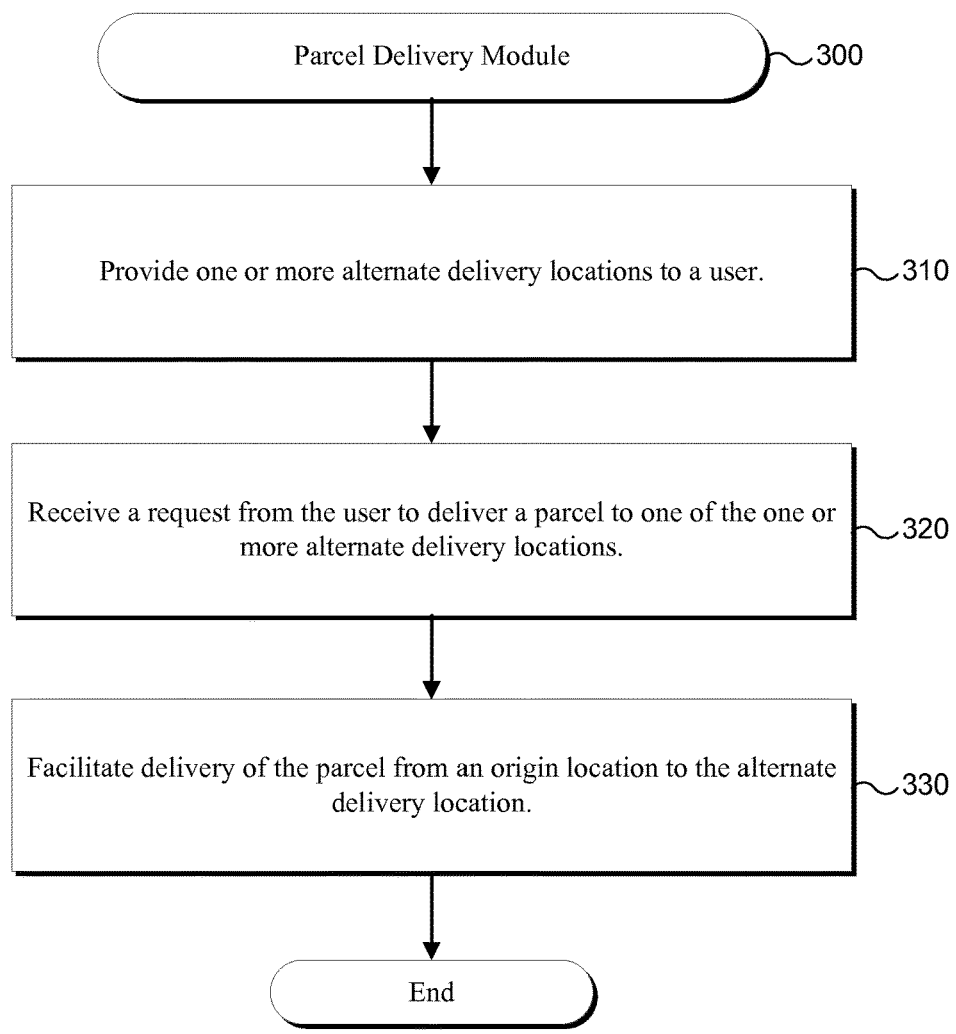
FIG. 3 depicts a flow chart that generally illustrates various steps executed by a parcel delivery module that, for example, may be executed by the logistics server of FIG. 1.

FIG. 3 is a flow chart of operations performed by an exemplary Parcel Delivery Module 300. In particular embodiments, the Parcel Delivery Module 300 may facilitate the delivery of parcels to an attended delivery/pickup location.

When executing the Parcel Delivery Module 300, the system begins, at Step 310, by displaying one or more attended delivery/pickup locations to a user. In various embodiments, these attended delivery/pickup locations include retail stores (e.g., including gas stations, grocery stores, and pharmacies), stand-alone kiosks, or any other suitable locations for receiving and holding parcels for pick up by recipients. In particular embodiments, attended delivery/pickup locations include attended delivery/pickup locations, but they may also include unattended delivery/pickup locations. In some embodiments, attended delivery/pickup locations may include locations (e.g., retail locations) other than the intended parcel recipient's home or business.

In various embodiments, the system may configured to determine and display available attended delivery/pickup locations based on any suitable criteria. For example, the system may be adapted to: (1) allow a user to request that the system display all attended delivery/pickup locations within a predetermined radius of the user; and (2) in response to the request, displaying all attended delivery/pickup locations within the predetermined radius of the user. In another embodiment, the system may be adapted to: (1) determine a location that a user is frequently located (e.g., the user's home or workplace); and (2) displaying all attended delivery/pickup locations within the predetermined radius of the location.

In particular embodiments, the system may be adapted to allow a vendor or other entity to open one or more attended delivery/pickup locations for a particular customer or event. In other embodiments, the system may be adapted to allow a vendor (e.g., a particular retailer) to select a subgroup of a group of available attended delivery/pickup locations that the vendor's products may be delivered to, and/or to exclude a subgroup of available delivery locations for delivery of the vendor's products. This feature may be particularly desirable for vendors who have a certain brand image that is inconsistent with the image of certain attended delivery/pickup locations (e.g., a high-end jewelry retailer may not wish to have their products picked up at a gas station, but may be happy to have their products picked up at a high-end department store).

The system continues, at Step 320, by receiving a request from the user to deliver a parcel to a particular one of the one or more attended delivery/pickup locations (which may, for example, have no formal relationship to the user). In particular embodiments, the request may come from the user after the user reviews a plurality of available attended delivery/pickup locations (see Step 310, above) as part of a checkout process when the user purchases an item from an online retail store.

The system continues, at Step 330, by facilitating the delivery of the parcel from an origin location to the attended delivery/pickup location. The origin location may include a home of the parcel sender, a warehouse associated with an online retailer, a retail store, or any other suitable location. In various embodiments, the system may facilitate the delivery of the parcel via any suitable common carrier or other logistics provider, etc.

In various embodiments, a system for delivering parcels to attended delivery locations may comprise features in addition to the system described above. These additional features are described more fully below.

A. Use of Attended Delivery/Pickup Locations within Brick-and-Mortar Stores

In various embodiments, an attended delivery/pickup location may be provided within a brick-and-mortar store, such as a department store, and used to facilitate the provision of adequate inventory to the store. The attended delivery/pickup location may be staffed by a third party (e.g., by an entity other than the brick-and-mortar store), or by the brick-and-mortar store itself.

In a particular embodiment, a separate attended delivery/pickup location is provided in each individual store within a network of department stores (or within a network of otherwise unaffiliated department stores or other stores). In various embodiments, the attended delivery/pickup locations are used to facilitate the transfer of items between the stores (or the purchase of one or more items from the inventory of another, unrelated store). In a particular example, a customer may visit a first department store location within a network of department stores (e.g., a brick and mortar "ABC Shoes" location in Marietta, Ga.), try on a particular pair of shoes in size 10.5, and determine that they actually need a size 11 in the shoes. If the Marietta location of ABC Shoes does not have the shoes in size 11, employees of the store may search nearby ABC Shoes locations (and/or the inventory of other shoe stores) to determine whether a nearby store has the shoes in size 11. Upon determining that another store has the shoes in the desired size, an employee of the Marietta store may use their computer to issue a request to the identified store (e.g. an ABC Shoes store in Alpharetta, Ga., or an XYZ store in Macon, Ga.) to send a pair of appropriate size 11 shoes to the Marietta ABC Shoes location.

In response to receiving the request, an employee at the Alpharetta ABC Shoes location may bring a box containing a size 11 pair of the shoes to an attended delivery/pickup location within the Alpharetta ABC Shoes. Representatives of the attended delivery/pickup location then facilitate the delivery of the shoes from the Alpharetta ABC Shoes store to the Marietta ABC Shoes store. In particular embodiments, this may reduce the overall cost of transporting the shoes from the first retail location to the second retail location because the carrier that services the attended delivery/pickup locations within the first and second retail locations may deliver items in bulk from the first location to the second location on a regular basis. The items may be, for example, transported together in a single container and/or transported directly from the first retail location to the second location, which may serve to reduce the per-item costs associated with transporting the items.

In various embodiments, when a particular item sought by a customer shopping at a particular retail store is unavailable (e.g., such as the shoes in size 11 in the example described above), the customer may request to have the item sent to an attended delivery/pickup location other than the attended delivery/pickup location at the particular retail store. In the size 11 shoe example above, the customer would be able to request to have the shoes sent to an attended delivery/pickup location other than the attended delivery/pickup location at the ABC Shoes in Marietta. The user may, for example, request to have the shoes delivered to an attended delivery/pickup location that is convenient to the user (e.g., such as an attended delivery/pickup location located near the customer's home or office).

In-store attended delivery/pickup locations may also be used in restocking the store's inventory from one or more warehouses (or other stores in the store's network of stores, which may include stores that are otherwise unrelated to the store). In particular embodiments, a carrier associated with the attended delivery/pickup locations coordinates regular shipments (e.g., bulk shipments) from each particular warehouse to each particular department store location. In various embodiments, new inventory is received at the store by workers who are associated with the attended delivery/pickup locations. The workers then coordinate the transfer of the items to store employees for stocking.

In various embodiments, in-store attended delivery/pickup locations may also be used to facilitate the return of items purchased from a retail web site that is: (1) associated with the department store in which the attended delivery/pickup location is located; and/or (2) not associated with the department store in which the attended/delivery location is located. For example, in a particular embodiment, an in-store attended delivery/pickup location within a particular BIG DEALS department store may be set up to accept returns of items purchased from www.Big Deals.com. In such cases, if a user purchases an item from www.Big Deals.com and wishes to return it, they may simply bring the item to the in-store attended delivery/pickup location within their local Big Deals department store and receive a refund for the item. In particular embodiments, there is no shipping charge (or other charge) associated with returning the item.

As another example, an in-store attended delivery/pickup location within a particular "Big Deals" department store may be set up to accept returns of items purchased from a retail web site that is unrelated to Big Deals. For example, the in-store attended delivery/pickup location may be set up to accept returns of items purchased from a retail web site called www.bestbargain.com. In a particular embodiment, if the user purchases an item from www.bestbargain.com and wishes to return it, they may bring the item to the in-store attended delivery/pickup location within their local Big Deals department store and receive a refund for the item. In particular embodiments, there is no shipping charge (or other charge) associated with returning the item.

In various other embodiments, the attended delivery/pickup location, the logistics company shipping the returned item, and/or the retail web site to which an item is being returned may charge the customer for returning the item. In particular embodiments, the return charge may be shared among one or more of: (1) the attended delivery/pickup location; (2) the logistics company shipping the returned item; (3) and/or the retail web site to which the item is being returned. In other embodiments, the return charge less the cost of shipping the item back to the retail website is shared rather than the full return charge. In other embodiments, the return charge may be shared among one or more of the attended delivery/pickup location, the logistics company shipping the returned item, and/or the retail web site to which an item the being returned in disproportionate quantities (e.g., 50% to the logistics company, 25% to the retail website, and 25% to the attended delivery/pickup location).

In particular embodiments, an in-store, attended delivery/pickup location within a particular brick-and-mortar store may be set up to: (1) receive items purchased at the store from users; and (2) ship the items to a location designated by the user (e.g., to the user's residential or business address, or to the address of another individual). In particular embodiments, the individual may: (1) not be charged for shipping the item; (2) be charged a discounted fee for shipping the item; or (3) may be charged the full fee for shipping the item. In various embodiments, the charge associated with shipping the item may depend upon the cost of the items (e.g., the customer may receive free or discounted shipping of purchases above a pre-determined threshold cost). In other embodiments, individuals who are members of a particular shipping subscription service may receive free or discounted shipping of items purchased at the retail location.

B. Customization of Networks of Attended Delivery/Pickup Locations

In various embodiments, the system may be adapted to allow users to define their own network of attended delivery/pickup locations. For example, a central logistics computer system (which a user may, for example, access via the Internet) may be configured to display respective graphical representations of a plurality of attended delivery/pickup locations on a map of an area associated with a particular user (e.g., a map of an area in which the user's home or business is located). The system may allow the user to select one or more attended delivery/pickup locations displayed by the graphical user interface as the default delivery/pickup locations to which any parcels to be delivered to the user by a particular logistics provider are to be delivered. For example, the user may select: (1) a first of the attended delivery/pickup locations as a primary attended delivery/pickup location that the logistics provider should deliver any of the user's parcels to, if the attended delivery/pickup location is available; and (2) one or more alternative attended delivery/pickup locations that the logistics provider should deliver any of the user's parcels to, if the primary attended delivery/pickup location is unavailable.

In various embodiments, if a particular delivery/pickup location becomes unavailable to accept deliveries during a particular period of time (e.g., the delivery/pickup location becomes full, or temporarily or permanently closes), the system may modify the graphical representation of the particular delivery/pickup location to indicate its unavailability. For example, the system may display one or more portions of the graphical representation of the particular delivery/pickup location in gray rather than black to indicate its current unavailability to accept packages.

C. Economic Models Associated with Holding Items for Pickup

In particular embodiments, the system may be configured for, in response to a parcel being delivered to a particular delivery/pickup location, generating an e-mail to the recipient of the parcel indicating a deadline by which the recipient must retrieve the parcel from the delivery/pickup location. In particular embodiments, the system saves this deadline to memory and, in response to the deadline passing without the system receiving an indication that the parcel has been picked up from the delivery/pickup location by the deadline, the system facilitates the return of the parcel from the delivery/pickup location to the parcel's sender. In various embodiments, the system facilitates the parcel's return by transmitting a message to an appropriate logistics server instructing a logistics provider to pick the parcel up from the delivery/pickup location and return the parcel to the parcel's sender.

In order to encourage customers to retrieve parcels before the stated deadline, the system may be adapted to provide one or more financial incentives for the parcel recipient retrieving the parcel by an early pickup deadline that is before the stated normal parcel pickup deadline. For example, the system may be adapted to provide the customer with a free or discounted future logistics service (or other financial incentive) in response to the user retrieving their parcel more than a day before the stated normal parcel pickup deadline. Similarly, the system may be adapted to allow users to extend the deadline by, for example, paying a fee to extend the deadline.

D. Method of Allowing Individuals to Coordinate Delivery of an Item to an Attended Delivery/Pickup Location via a Non-Participating Website In particular embodiments, the system may be adapted to allow a user to facilitate the delivery of an item ordered on a retail website to a particular attended delivery/pickup location. In a particular embodiment, the system first provides the user with an address associated with a particular logistics provider, as well as a code (e.g., a unique code) associated with the user. When the user completes an order of an item on a retail website, the user enters the logistics-provider-designated address in the delivery address field on the retail website, along with the code associated with the user.

As a result, when the retailer sends the item to the user in a parcel, the retailer attaches a shipping label to the parcel that includes the logistics-provider-designated address and user code. The parcel is then shipped to the logistics-provider-designated address by any suitable logistics provider (which may or may not be the particular logistics provider referenced above). Once the particular logistics provider receives the parcel at the logistics-provider-designated address, the particular logistics provider reads the user code and uses the user code to retrieve delivery information associated with the user from a data store, such as a database. The delivery information may include, for example, the user's name, contact information (e.g., e-mail address, cell phone number, etc. . . . ), and the address of the user's preferred attended delivery/pickup location.

The logistics provider may then: (1) facilitate the delivery of the parcel to the user's preferred attended delivery/pickup location (or other suitable attended delivery/pickup location); and (2) use the user's contact information to contact the user and inform them that the parcel will be delivered to the attended delivery/pickup location and provide them with instructions for retrieving the parcel. In a particular embodiment, the logistics provider may facilitate the delivery of the parcel to the user's preferred attended delivery/pickup location by relabeling the parcel with the user's name and address of the attended delivery/pickup location.

In alternative embodiments, the system may be adapted so that when the user completes an order of an item on the retail website, the user simply enters a code associated with the user and selects a particular logistics provider to handle delivery of the item to the user. In various embodiments, the logistics provider uses the code to retrieve user and delivery information in the manner described above. The logistics provider then uses the user and delivery information to facilitate delivery of the item to the user.

E. Systems for Facilitating Proper Handling of Parcels at an Attended Delivery/Pickup Location In various embodiments, the system may be adapted to remind individuals at each attended delivery/pickup location to enter information associated with parcels into the system as the parcels arrive at the attended delivery/pickup location. For example, the system may be adapted to display a reminder message at predetermined times during each work day that reminds users to use a bar code scanner associated with the system to scan the labels of any parcels that arrive at the attended delivery/pickup location. In other embodiments, the system may be adapted to display such reminders around times that parcels are scheduled to arrive at the attended delivery/pickup location. This may help to assure that information regarding each parcel is promptly entered into the system.

In particular embodiments, the system may be adapted for receiving information regarding the scheduled closure of each attended delivery/pickup location (e.g., holiday closures or permanent closures). The system may further be configured for: (1) communicating this information to users; (2) facilitating the rerouting of any parcels that are scheduled to be delivered to the attended delivery/pickup location while the attended delivery/pickup location is scheduled to be closed; and/or (3) removing the attended delivery/pickup location as an option for receiving deliveries while the attended delivery/pickup location is scheduled to be closed.

The system may also be adapted to employ various techniques for determining that a particular parcel has been delivered to a particular attended delivery/pickup location. For example, the system may be adapted to: (1) receive an indication that a particular parcel has been scanned at drop off; (2) receive data regarding the location at which the parcel was scanned at drop off (e.g., using GPS functionality associated with a handheld device or other electronic device); (3) compare the location with the geolocations of one or more attended delivery/pickup locations; and (4) in response to determining that the location at which the parcel was scanned at least generally corresponds to the geolocation of a particular attended delivery/pickup location, verify that the parcel has been delivered to the particular attended delivery/pickup location; and (5) save an indication to the system's memory indicating that the parcel has been delivered to the particular attended delivery/pickup location. In various embodiments, the system is further adapted to send confirmation (e.g., via e-mail, text message, etc.) to a recipient of the delivery of the particular parcel at least partially in response to verifying that the parcel has been delivered to the particular attended delivery/pickup location. In particular embodiments, the system is further adapted to send a request for confirmation of delivery to the attended delivery/pickup location and to receive such confirmation.

F. Systems for Facilitating Signature of Documents at Attended Delivery/Pickup Locations In various embodiments, attended delivery/pickup locations may be configured to manage the signature of documents, such as contracts and other legal documents. In a particular embodiment, to facilitate the signature of a contract, a first individual may send the document to a particular attended delivery/pickup location to be signed by a second individual. The delivery of the document to the attended delivery/pickup location may be facilitated as outlined above, and—when the document arrives at the particular attended delivery/pickup location, the system may notify the second individual that the document has arrived and provide instructions for the second individual to come to the particular attended delivery/pickup location and sign the document.

The second individual may then travel to the particular attended delivery/pickup location and, after providing identification (e.g., in the form of an ID card or a code displayed on the individual's mobile computing device) to a representative of the attended delivery/pickup location, sign the contract. The representative may then verify, in any suitable manner that the contract has been signed by the correct individual. For example, the representative may notarize the document and/or enter information into a data store associated with the system confirming that the contract has been signed by the correct individual. The representative may also create an electronic copy of the document and save the signed document into the system's memory for later retrieval and/or electronic transmission to the first and second individuals. Finally, the system and/or representative may coordinate the return of the original signed document to the first or second individual for their files.

In various embodiments, the document to be signed may include a unique bar code that is used to identify the document, track the document, and/or store the document in memory. In various embodiments, the unique barcode may be used to identify the document as well as the one or more signors of the document.

G. Provision of Value-Added Services at Attended Delivery/Pickup Locations

In particular embodiments, representatives at attended delivery/pickup locations may provide one or more value-added services on parcels and/or items at the attended delivery/pickup locations. This may occur, for example, as items and/or parcels are being returned for a refund, or simply shipped to another location. For example, the representatives may: (1) pack the items for shipping; (2) gift wrap the items; (3) facilitate the return of items to a retailer for a refund or exchange (see below); and/or (4) complete any other value-added service.

H. Use of Attended Delivery/Pickup Locations within Shopping Centers

A further use of attended delivery/pickup locations involves providing one or more attended delivery/pickup locations within a shopping center (e.g., a mall). In a particular embodiment the attended delivery/pickup locations are configured to: (1) receive items purchased at the shopping center from users; and (2) ship the items to a location designated by the user (e.g., to the user's residential or business address, to an attended delivery/pickup location close to the user's residential or business address, and/or to another address designated by the user). This may allow a user to purchase items at the shopping center and then facilitate transporting the purchased items to the user's home or another location without the hassle of leaving the shopping center with the items, transporting the items, etc. . . .

I. Capacity Management Techniques

In particular embodiments, a computer system may be used to estimate the current and/or future capacity of the attended delivery/pickup locations to receive and store parcels. This may be done, for example, using a particular algorithm that assumes, for example, that any parcels will be of a certain average size and will be stored by the attended delivery/pickup locations for a certain period of time before being picked up by a parcel recipient.

In other embodiments, the system may use more precise methods for monitoring the current and/or future capacity of attended delivery/pickup locations to receive and store parcels. For example, the volume of storage space within each attended delivery/pickup location may be stored within the system, and the actual dimensions of each parcel may also be entered into the system when the parcel is received by a logistics company and/or the attended delivery/pickup location. The system may then use this information to: (1) calculate the total volume of parcels that are being stored, or that will be stored, at a particular attended delivery/pickup location at a particular time; and (2) estimate the available capacity of the attended delivery/pickup location to store additional parcels by comparing the calculated parcel volume with the volume of storage space at the attended delivery/pickup location.

In particular embodiments, the system is adapted to determine that an attended delivery/pickup location is unavailable to accept additional deliveries if the estimated volume or number of parcels stored at the attended delivery/pickup location (or to be stored at the attended delivery/pickup location) is within a particular predetermined percentage of the attended delivery/pickup location's capacity. For example, if the attended delivery/pickup location is determined to be at 95% maximum capacity, the system may determine that the attended delivery/pickup location is unavailable to accept additional deliveries. In such a case, the system may reroute parcels scheduled to be delivered to the attended delivery/pickup location to an alternative attended delivery/pickup location and/or show the attended delivery/pickup location as being currently unavailable.

In other embodiments, the system may use one or more of the following different factors to determine whether a particular attended delivery/pickup location has the capacity to accept a particular parcel. Such factors include, for example: (1) the weight of a parcel; (2) the dimensions of the parcel; (3) average latency of parcels at the attended delivery/pickup location; (4) one or more characteristics of the parcel's intended recipient (e.g., how quickly the intended recipient usually retrieves parcels from attended delivery/ pickup locations); (5) typical characteristics of the clientele of the delivery/pickup location (e.g., how quickly the average customer of the attended delivery/pickup location retrieves parcels from the attended delivery/pickup location); (6) the cubic parcel storage capacity of the attended delivery/pickup location; (7) the density of the parcel and/or (7) the ability of the attended delivery/pickup location to extend its capacity to accept parcels. The system may also take into account the amount of labor required to physically add the parcel to the current inventory of the attended delivery/pickup location.

J. Methods for Recommending Attended Delivery/Pickup Locations to Users

In various embodiments, the system may be adapted to recommend particular attended delivery/pickup locations for the delivery of a particular parcel. In particular embodiments, the system may be adapted to automatically generate suitable recommendations based, at least in part, on: (1) the distance of the attended delivery/pickup location from a location specified by the user; (2) the estimated current or future capacity of the attended delivery/pickup location to accept deliveries; (3) trends in activity associated with the particular attended delivery/pickup location (e.g., if an attended delivery/pickup location experiences an day-to-day increase in volume above a certain threshold, the system won't recommend the attended delivery/pickup location for a predetermined number of days); or (4) any other suitable factors. After the system recommends one or more particular delivery/pickup locations, the user may either select one of the recommended attended delivery/pickup locations to receive the delivery, or specify a non-recommended attended delivery/pickup location to receive the delivery.

K. Methods for Handling a Parcel that is Destined for an Attended Delivery/Pickup Location That Has No Additional Capacity In some cases, a logistics system or other system may determine that a particular parcel is en route to a particular attended delivery/pickup location that has inadequate capacity to accept the parcel. In such cases, the system may, for example: (1) block the delivery of the parcel to the particular attended delivery/pickup location, re-route the parcel to an alternative attended delivery/pickup location, and inform the intended parcel recipient of the change; (2) hold the parcel for a predetermined period of time, deliver the parcel to the particular attended delivery/pickup location at a later time, and inform the intended recipient of the scheduling change; (3) deliver the parcel to the recipient's home or place of business; or (4) handle the situation in any other suitable manner. The system may determine which of the above approaches to take based at least in part, for example, on one or more user-specified preferences.

Various aspects of the system's functionality may be executed by certain system modules, including a Parcel Rerouting Module 400. This module is discussed in greater detail below.

Parcel Rerouting Module

Figure 4:
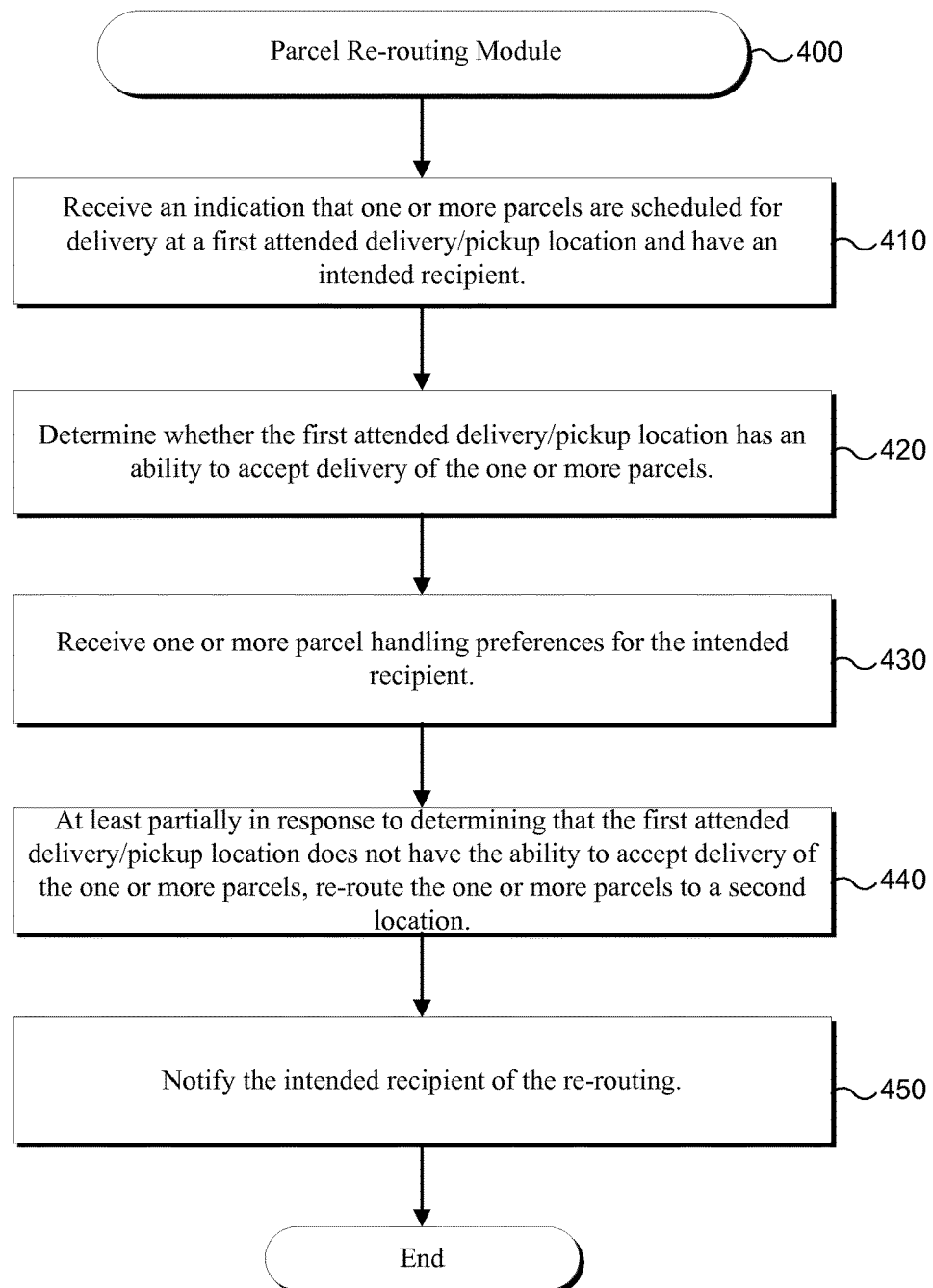
FIG. 4 depicts a flow chart that generally illustrates various steps executed by a Parcel Rerouting Module that, for example, may be executed by the logistics server of FIG. 1.

FIG. 4 is a flow chart of operations performed by an exemplary Parcel Rerouting Module 400. In particular embodiments, the Parcel Rerouting Module 400 may determine an appropriate manner in which to reroute a parcel destined for an attended delivery/pickup location that is unable to accept delivery of the parcel.

When executing the Parcel Rerouting Module 400, the system begins, at Step 410, by receiving an indication that one or more parcels are scheduled for delivery at a first attended delivery/pickup location and have an intended recipient. The system may receive the indication in any suitable manner, such as in any manner described in this disclosure. In particular embodiments, the system receives the indication in response to a request from a user to deliver one or more parcels to the attended delivery/pickup location (e.g., such as in Step 320 of the Parcel Delivery Module 300 described above). In other embodiments, the system is configured to receive the indication in any other suitable manner.

The system continues, at Step 420, by determining whether the first attended delivery/pickup location has an ability to accept delivery of the one or more parcels. The system may make this determination based at least in part on one or more suitable factors, such as, for example: (1) a current available capacity of said attended delivery/pickup location; (2) an estimated capacity of said attended delivery/pickup location at an estimated delivery time of said one or more parcels; (3) operating hours of said attended delivery/pickup location; (4) an ability of said attended delivery/pickup location to accommodate special handling instructions of said one or more parcels; and/or (5) any other suitable factor related to an attended delivery/pickup location's ability to receive parcels. In various embodiments, the system determines an ability of the attended delivery/pickup location to accept delivery of the one or more parcels based on any other suitable factor, such as any factor described in this disclosure.

At Step 430, the system receives one or more parcel handling preferences from the intended recipient. The one or more parcel handling preferences may include one or more preferences related to the intended recipient's preferences for delivery of parcels that are re-routed from an attended delivery/pickup location due, for example, to lack of capacity. The intended recipient may provide, for example: (1) a preference for a particular attended delivery/pickup location (e.g., a request to use the particular attended delivery/pickup location as a default attended delivery/pickup location); (2) a ranking of attended delivery/pickup locations that includes attended delivery/pickup locations that a user would be amenable to having parcels re-routed to in the case of a lack of capacity (e.g., from which the system may determine the highest ranked attended delivery/pickup location provided by the user with capacity to receive parcels); (3) a preference for re-routing parcels to attended delivery/pickup locations within a particular distance of an address associated with the intended recipient (e.g., their residential address, work address, etc.) or to the address associated with the intended recipient; (4) a preference to delay delivery to the first attended delivery/pickup location at least until the first attended/delivery has capacity/an ability to accept delivery of the one or more parcels; and/or (5) any other suitable preference related to parcel re-routing or attended delivery/pickup location selection, such as any of the preferences related to attended delivery/pickup location selection described in this disclosure.

At Step 440, the system, at least partially in response to determining that the first attended delivery/pickup location does not have capacity to accept the one or more parcels, re-routes the one or more parcels to a second location. Re-routing the one or more parcels may include facilitating delivery of the one or more parcels to a location other than the first attended delivery/pickup location, where the other location is a location determined based at least in part on one or more parcel handing preferences described in the context of Step 430 above.

Returning to step 450, the system notifies the intended recipient of the re-routing. The system may notify the user in any suitable manner. For example, the system may notify the intended recipient by sending an electronic message to the intended recipient (e.g., an e-mail, SMS message, text message, etc.), sending a message to a mobile device associated with the intended recipient, facilitating a phone call to notify the intended recipient, updating tracking information for the one or more parcels that is accessible by the intended recipient, etc.).

L. Methods for Determining Alternative Attended Delivery/Pickup Location

In various situations, such as the situation described immediately above, the system may re-route a parcel to an alternative attended delivery/pickup location. In such situations, the alternative attended delivery/pickup location may be identified based on, for example: (1) the distance of the alternative attended delivery/pickup location from the original, target attended delivery/pickup location; (2) the distance of the alternative attended delivery/pickup location from the customer's residence or place of business; (3) the last attended delivery/pickup location used by the customer; or (4) a previous preference expressed by the intended recipient of the parcel.

M. Methods for Allowing Customer to Reserve Space in an Attended Delivery/Pickup Location In certain embodiments, the system may be adapted to allow users to reserve space for a particular parcel at a particular attended delivery/pickup location so that delivery to the particular attended delivery/pickup location (rather than an alternative location) is guaranteed. The system may or may not charge the parcel recipient for making such a reservation. In certain embodiments, the system provides such reservations free of charge to those subscribing to a paid premium logistics service.

In various embodiments, the system is adapted to allow users to reserve one or more spaces (e.g., a block of spaces) at an attended delivery/pickup location. In particular embodiments, the system is adapted to allow users to reserves the one or more spaces at a time before any parcels are scheduled for delivery for the user at the attended delivery/pickup location where the user reserved the one or more spaces. The user may, for example, reserve the one or more spaces on a particular day (e.g., or days) in the future. In various embodiments, the ability to reserve attended delivery/pickup spaces in advance may allow users to ensure that there will be space at the attended delivery/pickup location for a future order that the user is planning, or for a future shipment that the user anticipates receiving.

In particular embodiments, the users reserving the space may include individuals, customers, manufacturers, corporations, etc. For example, a company releasing a new product (e.g, Apple® releasing a new smartphone) may reserve one or more spaces at various attended delivery/pickup locations for the release date of the product. The company may then schedule shipment of the new product to each of the attended delivery/pickup locations in order to allow users to pick up the product ordered by the customer or purchase the product directly from the attended delivery/pickup location on the release date. In this way, attended delivery/pickup locations may serve as temporary storefronts for companies who may, for example, wish to increase the availability of their product, or facilitate a more convenient purchase or pickup of the product by their customers.

N. Methods for Facilitating the Return of Items Using an Attended Delivery/Pickup Location Attended delivery/pickup locations may be configured, in some embodiments, to facilitate the return of previously purchased items to a retailer for a refund or exchange. For example, in particular embodiments, a representative at an attended delivery/pickup location (and/or a computer system associated with the attended delivery/pickup location) determines whether a particular item may be returned/exchanged and: (1) if the item may not be returned/exchanged, inform the individual attempting to return the item that the item may not be returned/exchanged; or (2) if the item may be returned/exchanged, facilitate the return/exchange of the item in accordance with terms specified by the retailer to which the item is to be returned. In a particular embodiment, the system may be adapted to: (1) read a machine-readable indicia (e.g., a UPC code, a transaction code associated with the sale of the item to the individual attempting to exchange the item, or other suitable item identifier) associated with an item to be returned; and (2) use information derived from the machine-readable indicia to determine whether the item may be returned/exchanged. In particular embodiments, the derived information may include a deadline for returning/exchanging the item. If an item is currently eligible to be returned or exchanged, the system may optionally determine when the user should receive either a refund for the item or a substitute item and provide this information to the user.

In a particular embodiment in which the user is returning an item to a retail website by dropping the item at an attended delivery/pickup location, the system may be configured to provide a return label for placing on a parcel containing the item that the user is returning. In various embodiments, the return label may expire at the end of a particular return period (e.g., a period provided by the retail website in which the user (e.g., customer) may return items to the retail website in exchange for a full or partial refund). In particular embodiments, if the return label has not expired, the system may facilitate the shipment of the returned item from the attended delivery/pickup location to the retail website (e.g., a warehouse, storage facility, or processing facility associated with the retail website) at no cost to the user. In various embodiments, the system, in response to determining that the return label has expired, may facilitate the shipment of the returned item from the attended delivery/pickup location to the retail website (e.g., a warehouse, storage facility, or processing facility associated with the retail website) after charging the user a return fee. In other embodiments, if the return label has expired, the system may facilitate the shipment of the returned item from the attended delivery/pickup location to the retail website (e.g., a warehouse, storage facility, or processing facility associated with the retail website) at no cost to the user; the system may then be configured to notify the retail website that the return period for the returned item has expired, and the retail website may charge the user for the return (e.g., deduct the cost of shipping the returned item from any refund to which the user may be entitled).

In various embodiments, a computer system at each attended delivery/pickup location may be adapted to provide users with access to one or more checklists and/or questionnaires that may be used to make sure that all parts of a particular item are present before the item is returned to a retailer for a refund or exchange. This may save the retailer time and money associated with replacing sub-parts of returned items.

O. Methods for Facilitating the Pickup of Parcels or Other Items from an Attended Delivery/Pickup Location Various techniques may be used to facilitate the pickup of parcels or other items from an attended delivery/pickup location. For example, a user may be provided with an electronic ID card or other device that may be used to quickly identify the individual and any parcels that are to be picked up by the individual at a particular attended delivery/ pickup location. Similarly, the user may be provided with an application on the user's mobile computing device that facilitates identification of the user via near field communications, or one or more bar codes displayed on the screen of the mobile device. Such a bar code may alternatively be printed (e.g., as a voucher) and presented to a representative of an attended delivery/pickup location to facilitate quick identification and pickup of one or more parcels stored at the attended delivery/pickup location.

In various embodiments, the system may be adapted to facilitate the pickup of a parcel by an individual other than the intended recipient of the parcel by, for example, having the intended recipient transfer the electronic ID card (or a printed voucher generated by the system) to another individual. The other individual may then present the electronic or physical ID card or voucher to a representative at the attended delivery/pickup location to verify that the individual is authorized to pick up the parcel on the intended recipient's behalf. After the representative uses the system to verify the authenticity of the electronic or physical ID card or voucher, the representative may transfer the parcel to the individual.

In various embodiments, the electronic ID card discussed above may be adapted so that it is only valid when the electronic ID card (or a device displaying the card) is located at a particular geographic location (e.g., at or near a particular GPS coordinate, or within a particular Bluetooth network, or close enough to a particular computing device to communicate with the device using near field communications).

In various embodiments, the system may be adapted to create an electronic token to verify that the user's computing device (and, therefore, presumably the user) was present at a location when a parcel was picked up. This may serve as evidence that the parcel was picked up by the intended recipient rather than another individual.

P. Methods for Facilitating the Immediate Sale and Delivery of Popular Items from an e-Commerce Site In particular embodiments, an attended delivery/pickup location may stock one or more items that sell frequently on an e-commerce web site (e.g., bestselling books, DVD's, or CD's). In particular embodiments, when a user of the e-commerce web site indicates that they wish to purchase such an item, the system may search the inventory of one or more attended delivery/pickup locations that are geographically close to the user (as determined by the user's mobile device, from information provided by the user, etc. . . . ) to determine whether the attended delivery/pickup locations have the item in stock. If so, the system may inform the user that a nearby attended delivery/pickup location has the item in stock, and provide the user with the option of paying for the item online and then picking the item up (e.g., substantially immediately on the same day) from the nearby attended delivery/pickup location.

In such cases, after the user purchases the item on the e-commerce site, the system may generate a physical or electronic receipt that the user may use to retrieve the item from the identified attended delivery/pickup location. The system may also electronically notify the attended delivery/pickup location that the user has purchased the item and request that the item be set aside for the user.

Q. Methods and Systems for Training Employees of an Attended Delivery/Pickup Location In particular embodiments, each attended delivery/pickup location may be provided with a client computer that may be switched between an active mode (in which the client computer is adapted to facilitate the pickup, delivery, and/or tracking of parcels), and a training mode (in which the client computer is adapted to train individuals how to use the system). In particular embodiments, when the client computer is in the training mode, the computer simulates the operation of the computer when the computer is in active mode and provides instructions on how to properly operate the computer.

R. Methods and Systems for Conducting a Survey at an Attended Delivery/Pickup Location In particular embodiments, when a user picks up a parcel at a particular attended delivery/pickup location, the user is presented with an electronic survey of their experience at the attended delivery/pickup location. If the user rates the experience highly (e.g., 9-10 out of a possible 10), the system invites the user to go onto a social media website, such as Facebook, to provide comments and/or other feedback. This may help to expand the number of positive comments on the social media website.

S. Provision of Customized Web Site for Each Attended Delivery/Pickup Location

In various embodiments, the system is adapted to provide a customized website for each attended delivery/pickup location. The website may include a private portion that may only be accessed by individuals associated with the particular attended delivery/pickup location. This private portion may display, for example, information regarding how much the attended delivery/pickup location has earned through delivery/pickup activities and other relevant information.

The website may also include a public portion that allows the particular attended delivery/pickup location to advertise special offers, such as offers for discounted merchandise. In particular embodiments, particular offers may only if the user retrieves their one or more parcels from the attended delivery/pickup location before a particular location.

T. Methods for Enabling Users to Define Attended Delivery/Pickup Location Attributes In particular embodiments, the system is adapted to allow users of the system to define and change various attributes associated with a particular attended delivery/pickup location. Particular attributes which a user may define include, for example, the hours of operation of the attended delivery/pickup location. For example, a user may define hours of operation based at least in part on the hours of operation of the retail store at which the attended delivery/pickup location is located. In various embodiments, users may define hours of operation based on any other suitable factor and may change hours of operation for any suitable reason (e.g., based at least in part on or due to staff availability to man the attended delivery/pickup location, based at least in part on holidays or holiday schedules, etc.)

In other embodiments, users may define which particular items may be delivered to and/or temporarily stored at the attended delivery/pickup location. For example, a user may define an attended delivery/pickup location such that the attended delivery/pickup location may only accept a particular model of a new mobile computing device. In particular embodiments, the system may be configured to limit accepted items to allowed items by using one or more stock-keeping units (e.g., SKUs) associated with the allowed items. In other embodiments, the system may ensure that only allowed items are accepted by the attended delivery/pickup location using any other suitable technique (e.g., by scanning a barcode associated with an item when it is presented to the attended delivery/pickup location, etc.)

In particular embodiments the system may be configured to allow a user to define any other attribute associated with the attended delivery/pickup location. In various embodiments, the system may be configured to receive a listing of one or more users who are authorized to define and/or change the various attributes associated with the attended delivery/pickup location. Authorized users may include, for example, the owner of the attended delivery/pickup location, the owner of the retail store in which the attended delivery/pickup location is located, an authorized manager or employee of the attended delivery/pickup location or the retail store with which the attended delivery/pickup location is associated, an authorized representative of a logistics company associated with facilitating delivery and/or pickup of items to or from the attended delivery/pickup location, etc.

U. Methods for Facilitating Substantially Anonymous Delivery to and Pickup from an Attended Delivery/Pickup Location In particular embodiments, the system is adapted to enable a user to request delivery of one or more items to an attended delivery/pickup location substantially anonymously. As a particular example, a user may order one or more items from an online retailer for delivery to a particular attended delivery/pickup location. In various embodiments, the system may enable the user to complete a transaction with the online retailer for the item as a guest (e.g., without logging into an account associated with the user or the online retailer). The user may then request, as part of the transaction, that the one or more items be delivered to an attended delivery/pickup location. In particular embodiments, the system may be configured to facilitate delivery of the one or more items to the attended delivery/pickup location without associating a name or other identifying characteristic of the user with the one or more items.

The system may, in various embodiments, assign an alias to the user (e.g., such as a unique identifying string of characters, etc.) In other embodiments, the system may be configured to associate a confirmation number with the shipment of the one or more items. In various embodiments, the system may be adapted to require the user to present something other than a proof of identification of the user when the user goes to the attended delivery/pickup location to pick up the one or more items. For example, the system may require the user to present the confirmation number or alias in order to retrieve the one or more items, the system may require the user to show an e-mail, text message, or other suitable confirmation message confirming that the user placed the order for the one or more items, etc. In other embodiments, the system may be configured to require confirmation by a user picking up the one or more items from the attended delivery/pickup location that the user placed the order for the one or more items in any other suitable manner (e.g., a manner in which the user's anonymity is substantially maintained).

V. Systems for Determining Suitability of Locations as Attended Delivery/Pickup Locations In various embodiments, the system is configured to determine a suitability of a particular location to serve as a location for an attended delivery/pickup location. In particular embodiments, the determination is based on, for example: (1) a number of returns that occur at the particular location (e.g., where the particular location is a retail location); (2) a number of complaints about the location (e.g., complaints from customers of a business at the location); (3) geographic and demographic data associated with the particular location; (4) third party commercially available data (e.g., a volume of sales at a business associated with the particular location, an average number of customers that patronize a business associated with the particular location, etc.); and (5) any other suitable factor.

In particular embodiments, determination of suitability for a location as an attended delivery/pickup location is determined using any suitable technique used by retailers or other businesses when selecting a suitable location to open a particular business. In other embodiments, the determination is based at least in part on logistics data (e.g., based at least in part on particular shipping routes utilized by logistics companies, etc.). In other embodiments, the determination may be based on any suitable combination of the factors discussed above, or any other factors.

W. Flexible Activation of Alternative Delivery Locations

In various embodiments, the system is adapted to allow a user to quickly activate and/or deactivate one or more attended delivery/pickup locations, and/or to create one or more time-limited attended delivery/pickup locations (e.g., alternative delivery locations that are set to exist for only a pre-determined amount of time). In a particular embodiment, the system is adapted to allow a user to set up a particular attended delivery/pickup location by: (1) specifying the attended delivery/pickup location; (2) specifying a start time for the attended delivery/pickup location to be in existence; and (3) specifying an end time for the attended delivery/pickup location to be in existence. In various embodiments, the start time is selected to occur at about the beginning of a particular event (e.g., a particular concert, party, sporting event, or other event), and the end time is selected to occur at about the end of the particular event. In particular embodiments, the event may be staffed by one or more individuals associated with the particular event.

X. Regularly Scheduled Pickups

In various embodiments, the system is adapted to coordinate pickups, on a regular basis (e.g., daily, weekly, etc. . . . ) from a particular location. Such pickups may be made by one or more logistics providers that service attended delivery/pickup locations. This service may be implemented for a fee, or for no charge.

In particular embodiments, the system may be adapted to allow individuals to issue a real-time pickup request to have a parcel picked up at a particular location. In particular embodiments, the system may be adapted to automatically select a common carrier from a plurality of common carriers to handle the requested parcel pickup. The system may do this, for example, by: (1) informing a plurality of common carriers of the request; (2) accepting one or more respective bid prices from each of the plurality of common carriers for which the respective common carriers would be willing to handle the requested parcel pickup; (3) based, at least in part, on the respective bid prices, selecting a particular one of the plurality of common carriers to handle the request; and (4) in response to selecting the particular common carrier, facilitating the pickup of the parcel by the particular common carrier.

Y. Automatic Tariff Changes

In various embodiments, the system is adapted to calculate the amount that a particular individual will pay in parcel shipping charges in a way that is customized for the situation at hand. For example, the shipping charge associated with shipping a parcel from a particular on-line retailer to an individual may be based, at least in part, on: (1) the current availability and/or capacity of an attended delivery/pickup location to which the parcel is to be delivered; (2) the frequency of the individual's purchasing and/or shipment activity (e.g., frequent purchasers and/or shippers may receive a discount); (3) the carrier handling the delivery; (4) loyalty to a particular attended delivery/pickup location; (5)

loyalty to the carrier handling the delivery; and/or (6) total frequency of shipments to the attended delivery/pickup location on the individual's behalf. In particular embodiments, the system may be customizable by any suitable party (e.g., the owner of an attended delivery/pickup location) or any combination of suitable parties to calculate customized shipping rates based on any combination of any suitable factors, such as the factors listed above.

Z. Exemplary Delivery Configurations

In particular embodiments, the system may be adapted to facilitate the delivery of one or more parcels between various different types of locations. For example, the system may be adapted to facilitate the delivery of one or more parcels from: (1) an attended delivery/pickup location to an individual's home; (2) an attended delivery/pickup location to another attended delivery/pickup location; (3) an individual's home to an attended delivery/pickup location; and (4) a first individual's home to a second individual's home.

Illustrative Example

FIG. 5 depicts an exemplary transportation diagram that generally illustrates the delivery of a parcel 500 directly to an attended delivery/pickup location 512, 514, 516. As may be understood from this figure, parcel recipients may elect to have parcels delivered directly to attended delivery/pickup locations 512, 514, 516 rather than to other locations that are more closely associated with the parcel recipient (e.g., the parcel recipient's home or workplace). In various embodiments, a system for coordinating the delivery of parcels to attended delivery/pickup locations may provide each potential parcel recipient with a selection of attended delivery/pickup locations from which the parcel recipient may select one or more attended delivery/pickup locations to have their inbound parcels to be delivered to. For example, the system may present the user with a plurality of attended delivery/pickup locations (e.g., such as delivery locations 512, 514, 516). These attended delivery/pickup locations may include attended delivery/pickup locations that are located near (e.g., within a particular distance of) one or more locations such as the parcel recipient's home, the parcel recipient's place of work, or any other location that is closely associated with the parcel recipient.

For example, a particular attended delivery/pickup location 512 may be a gas station located half a mile from the user's workplace 513. Another attended delivery/pickup location 514 may be a grocery store three blocks from the user's apartment 515. Yet another attended delivery/pickup location 516 may include a flower shop next door to a gymnasium 517 of which the user is a member. As may be understood from FIG. 4, a common carrier (e.g., or other logistics company) may deliver parcels directly to such attended delivery/pickup locations rather than to the locations that are more closely associated with the parcel recipient 513, 515, 517.

As noted above, delivering to attended delivery/pickup locations rather than particular addresses (e.g., such as home addresses) more closely associated with particular parcel recipient may be beneficial for common carriers in that it may reduce the total number of addresses that the common carrier may need to deliver parcels to in a particular day. This process may also be advantageous to parcel recipients because it may assure that their parcel is delivered to a convenient, attended location. This may, for example, eliminate the risk associated with having the common carrier leave the parcel outside the parcel recipient's home, or with having the parcel misplaced or improperly routed within the parcel recipient's workplace. In particular embodiments, the system is configured to deliver a parcel to whichever attended delivery/pickup location (e.g., attended delivery/pickup location 512, 514, or 516) the user selects.

CONCLUSION

Many modifications and other embodiments of the invention will come to mind to one skilled in the art to which this invention pertains having the benefit of the teachings presented in the foregoing descriptions and the associated drawings. While examples discussed above cover the use of the invention in the context of attended delivery/pickup locations (e.g., attended retail delivery/pickup locations), the invention may be used in any other suitable context, such as within the context of: (1) unattended delivery/pickup locations; (2) attended delivery-only locations; (3) attended pickup-only location; (4) unattended delivery-only locations; and (5) unattended pickup-only locations. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for the purposes of limitation.

What is claimed is:

1. A non-transitory computer-readable medium storing computer-executable instructions that, when executed by at least one processor of a computing system, cause the computing system to perform a method comprising:
   (a) receiving, by a logistics system comprising a logistics server in operable communication with a logistics network, one or more parcel handling preferences from a user for delivery of parcels that require re-routing from an attended delivery/pickup location;
   (b) receiving, by the logistics system, an indication that one or more parcels are scheduled for delivery from a first location to a first attended delivery/pickup location, wherein said user is an intended recipient of said one or more parcels and said first attended delivery/pickup location comprises a location other than the user's home or place of business;
   (c) determining, based on capacity monitoring by the logistics system, whether said first attended delivery/pickup location has capacity to accept delivery of said one or more parcels based at least in part on:
      (i) a determined storage volume available at said first attended delivery/pickup location;
      (ii) an average retrieval time for parcels delivered to said first attended delivery/pickup location;
      (iii) one or more dimensions of said one or more parcels; and
      (iv) an average size of parcels stored at said first attended delivery/pickup location, wherein determining whether said first attended delivery/pickup location has capacity to accept delivery of said one or more parcels comprises ensuring that there will be enough physical space at said first attended delivery/pickup location to accommodate said one or more parcels at an estimated time of delivery of said one or more parcels by:
         storing data associated with a volume of storage space within said first attended delivery/pickup location;
         determining a total storage volume available at said first attended delivery/pickup location based on the volume of storage space data;

receiving one or more dimensions of one or more parcels that are currently being stored at said first attended delivery/pickup location;

determining a total parcel volume of said one or more parcels that are currently being stored at said first attended delivery/pickup location using said received one or more dimensions;

determining how quickly an average customer of said first attended delivery/pickup location retrieves parcels from said first attended delivery/pickup location; and calculating, by the logistics system, an available capacity estimate for the first attended delivery location, where the calculating comprises determining whether said first attended delivery location will have enough physical space to accommodate said one or more parcels at said estimated time of delivery based on said determined total storage volume at said first attended delivery/pickup location, said total parcel volume of said one or more parcels that are currently being stored at said first attended delivery/pickup location, and how quickly an average customer of said attended delivery/pickup location retrieves parcels from said first attended delivery/pickup location, wherein the logistics system compares the total storage volume with the total parcel volume at a given time;

(d) automatically re-routing by the logistics system, at least partially in response to receiving a determination that said first attended delivery/pickup location does not have capacity to accept delivery of said one or more parcels, said one or more parcels based at least in part on said one or more parcel handling preferences;

(e) at least partially in response to said re-routing, facilitating delivery of said one or more parcels to a second location, wherein delivery to the second location comprises: receiving, by the logistics system, location data for said one or more parcels based at least partially on a machine-readable indicator associated with said one or more parcels; and automatically verifying, by the logistics system, said one or more parcels have been delivered to the second location based at least on the rerouting and the location data; and (f) automatically notifying said user of said re-routing at a user device.

2. The non-transitory computer-readable medium of claim 1, wherein:

said one or more parcel handling preferences comprise a preference to reroute said one or more parcels to an attended delivery/pickup location that is most proximate to said first attended delivery/pickup location; and said second location is a second attended delivery/pickup location.

3. The non-transitory computer-readable medium of claim 1, wherein:

said one or more parcel handling preferences comprise a preference to reroute said one or more parcels to a residence associated with said user; and said second location is said residence.

4. The non-transitory computer-readable medium of claim 1, wherein:

said one or more parcel handling preferences comprise a preference to reroute said one or more parcels to an attended delivery/pickup location that is most proximate to a residence associated with said user;

said re-routing comprises:

determining a location of said attended delivery/pickup location that is most proximate to said residence associated with said user; and determining, based on capacity monitoring by the logistics system, whether said attended delivery/pickup location that is most proximate to said residence associated with said user has capacity to accept delivery of said one or more parcels; and at least partially in response to determining that said attended delivery/pickup location that is most proximate to said residence associated with said user has capacity to accept delivery of said one or more parcels, facilitating delivery of said one or more parcels to said attended delivery/pickup location that is most proximate to said residence associated with said user.

5. The non-transitory computer-readable medium of claim 1, wherein:

said one or more parcel handling preferences comprise a preference to delay delivery to said first attended delivery/pickup location at least until said first attended delivery/pickup location has capacity to accept delivery of said one or more parcels; and said second location is said first location.

6. The non-transitory computer-readable medium of claim 1, wherein:

said one or more parcel handling preferences comprise a preference for one or more attended delivery/pickup location other than said first attended delivery/pickup location;

each of said one or more attended delivery/pickup locations includes a respective ranking received from said user; and said non-transitory computer-readable medium further stores computer-executable instructions to perform a method comprising:

determining, by the logistics system, which of said one or more attended delivery/pickup locations have a highest ranking of said respective rankings; and at least partially in response to determining which of said one or more attended deliver/pickup locations have said highest ranking, facilitating delivery of said one or more parcels to said highest ranked of said one or more attended delivery/pickup locations.

7. The non-transitory computer-readable medium of claim 6, wherein said non-transitory computer-readable medium further stores computer-executable instructions to perform a method comprising:

determining, based on capacity monitoring by the logistics system, whether said highest ranked of said one or more attended delivery/pickup locations has capacity to accept delivery of said one or more parcels; and at least partially in response to determining said highest ranked one or more attended delivery/pickup locations does not have capacity to accept delivery of said one or more parcels:

determining, by the logistics system, which of said one or more attended delivery/pickup locations have a second highest ranking of said one or more attended delivery/pickup locations; and facilitating delivery of said one or more parcels to said second highest ranked of said one or more attended delivery/pickup locations.

8. The non-transitory computer-readable medium of claim 1, wherein said second location is said first location.

9. A computer system comprising:

at least one computer processor, wherein said at least one computer processor is configured for:

(A) receiving, by a logistics system comprising a logistics server in operable communication with a logistics network, an indication that one or more parcels are scheduled for delivery from a first location to a first attended delivery/pickup location, said one or more parcels having an intended recipient;

(B) determining, based on capacity monitoring by the logistics system, whether said first attended delivery/pickup location has capacity to accept delivery of said one or more parcels to ensure that there will be enough physical space at said first attended delivery/pickup location to accommodate said one or more parcels at an estimated time of delivery of said one or more parcels, comprising:

receiving one or more first dimensions of one or more parcels that are currently being stored at said first attended delivery/pickup location;

determining a current total volume of parcels that are currently being stored at said first attended delivery/pickup location using said one or more first dimensions;

determining a total volume of storage space at said first attended delivery/pickup location;

determining how quickly an average customer of said first attended delivery/pickup location retrieves parcels from said first attended delivery/pickup location;

determining one or more second dimensions of said one or more parcels scheduled for delivery from said first location to said first attended delivery/pickup location; and calculating, by the logistics system, an available capacity estimate for the first attended delivery location, the calculating comprising determining whether said first attended delivery/pickup location have capacity to accept delivery at said estimated time of delivery based on said determined current total volume of parcels, said total volume of storage space at said first attended delivery/pickup location, how quickly said average customer of said first attended delivery/pickup location retrieves parcels from said first attended delivery/pickup location and said one or more second dimensions of said one or more parcels by:

automatically estimating, by the logistics system, a future volume of parcels stored at said first attended delivery/pickup location at said estimated time of delivery based on said determined current total volume of parcels and how quickly said average customer of said first attended delivery/pick-up location retrieves parcels from said first attended delivery/pickup location; and comparing said estimated future volume of parcels with said total volume of storage space and said one or more second dimensions of said one or more parcels to determine whether there will be enough physical space at said first attended delivery/pickup location to accommodate said one or more parcels at said estimated time of delivery, (C) at last partially in response to determining that said first attended delivery/pickup location does not have capacity to accept delivery of said one or more parcels:

automatically notifying said intended recipient of said lack of capacity; and providing, to said intended recipient, a selection of one or more rerouting options, wherein said one or more re-rerouting options are selected from the group consisting of:

(1) re-routing said one or more parcels to a second attended delivery/pickup location;

(2) delaying a delivery of said one or more parcels to said first attended delivery/pickup location at least until said first attended delivery/pickup location has said capacity to accept delivery of said one or more parcels; and (3) re-routing said one or more parcels to an address associated with said intended recipient;

(D) at least partially in response to providing said selection of said one or more re-routing options, receiving a selection of one of said one or more re-routing options from said intended recipient; and (E) automatically re-routing, by the logistics system, said one or more parcels based at least in part on said selected one or more re-routing options, wherein the re-routing comprises receiving location data for the one or more parcels, and automatically verifying the re-routing based at least in part on the selected re-routing option and the location data.

10. The computer system of claim 9, wherein:
said selected one or more re-routing options comprises re-routing said one or more parcels to a second attended delivery/pickup location; and
re-routing said one or more parcels based at least in part on said selected one or more re-routing options comprises facilitating delivery of said one or more parcels to said second attended delivery/pickup location.

11. The computer system of claim 9, wherein the logistics system is further configured for determining a suitable second attended delivery/pickup location.

12. The computer system of claim 11, wherein
said determining said suitable second attended delivery/pickup location comprises determining said suitable second attended delivery/pickup location based at least in part on one or more preferences provided by said intended recipient.

13. The computer system of claim 12, wherein
said one or more preferences include a preference for said second attended delivery location to be located within a particular distance of a residence associated with said intended recipient.

14. The computer system of claim 12, wherein
said one or more preferences include a preference for said second attended delivery location to be located within a particular distance of an office associated with said intended recipient.

15. The computer system of claim 13, wherein:
said selected one or more re-routing options comprises delaying said delivery of said one or more parcels to said first attended delivery/pickup location at least until said first attended delivery/pickup location has capacity to accept delivery of said one or more parcels; and
re-routing said one or more parcels based at least in part on said selected one or more re-routing options comprises facilitating said delivery of said one or more parcels to said first attended delivery/pickup location once said first attended delivery/pickup location has capacity to accept delivery of said one or more parcels.

16. The computer system of claim 13, wherein:
said selected one or more re-routing options comprises re-routing said one or more parcels to said address associated with said intended recipient; and
said address associated with said intended recipient is a residential address of said intended recipient.

17. A computer-implemented method comprising:
receiving, from a parcel recipient, one or more parcel handling preferences for delivery of parcels that are re-routed from an attended delivery/pickup location due to lack of capacity of said attended delivery/pickup location;

determining, by a logistics system comprising a logistics server in operable communication with a logistics network, whether a particular attended delivery/pickup location to which a parcel is being directed has an ability to accept said parcel, the determining based on capacity monitoring by the logistics system, wherein said determining comprises:
- determining a current volume of parcels stored at said particular attended delivery/pickup location;
- determining a total volume of storage space at said particular attended delivery/pickup location;
- determining one or more dimensions of said parcel; and
- determining whether said particular attended delivery/pickup location has said ability to accept said parcel based on said determined current volume of parcels, said total volume of storage space at said particular attended delivery/pickup location, and said one or more dimensions of said parcel;

in response to determining that said particular attended delivery/pickup location does not have said ability, adjusting, by the logistics system the delivery of said parcel, wherein said adjusting is based on said one or more parcel handling preferences and is selected from a group consisting of:
- (a) causing, by the logistics system, a redirection of said parcel to an alternate attended delivery/pickup location;
- (b) causing, by the logistics system, a delay of delivery of said parcel to said attended delivery/pickup location to a later time;
- (c) causing, by the logistics system, delivery of said parcel to an address associated with a parcel recipient, wherein the adjusting comprises receiving, by the logistics system, location data for the one or more parcels, and automatically verifying the adjustment based on the parcel handling preferences and the location data; and facilitating the delivery of the parcel based on the adjusting.

18. The computer-implemented method of claim 17, wherein said adjustment is based at least in part on one or more preferences received from said parcel recipient.

19. The computer-implemented method of claim 17, wherein said alternate attended delivery/pickup location is selected based at least in part on a factor selected from the group consisting of:
- (a) a distance of said alternate attended delivery/pickup location from said attended delivery/pickup location;
- (b) an estimated current capacity of said alternate attended delivery/pickup location to accept deliveries;
- (c) an estimated future capacity of said alternate attended delivery/pickup location to accept deliveries; and
- (d) a preference provided by said parcel recipient.

20. The computer-implemented method of claim 17, wherein said determining whether said particular attended delivery/pickup location to which said parcel is being directed has said ability to accept said parcel comprises determining said ability based at least in part on:
- operating hours associated with said particular attended delivery/pickup location; and
- an estimated delivery time of said parcel at said particular attended delivery/pickup location.

* * * * *